INVENTOR:
Gustav Gastrich,
BY Alfred E. Ipchinger
ATTORNEY.

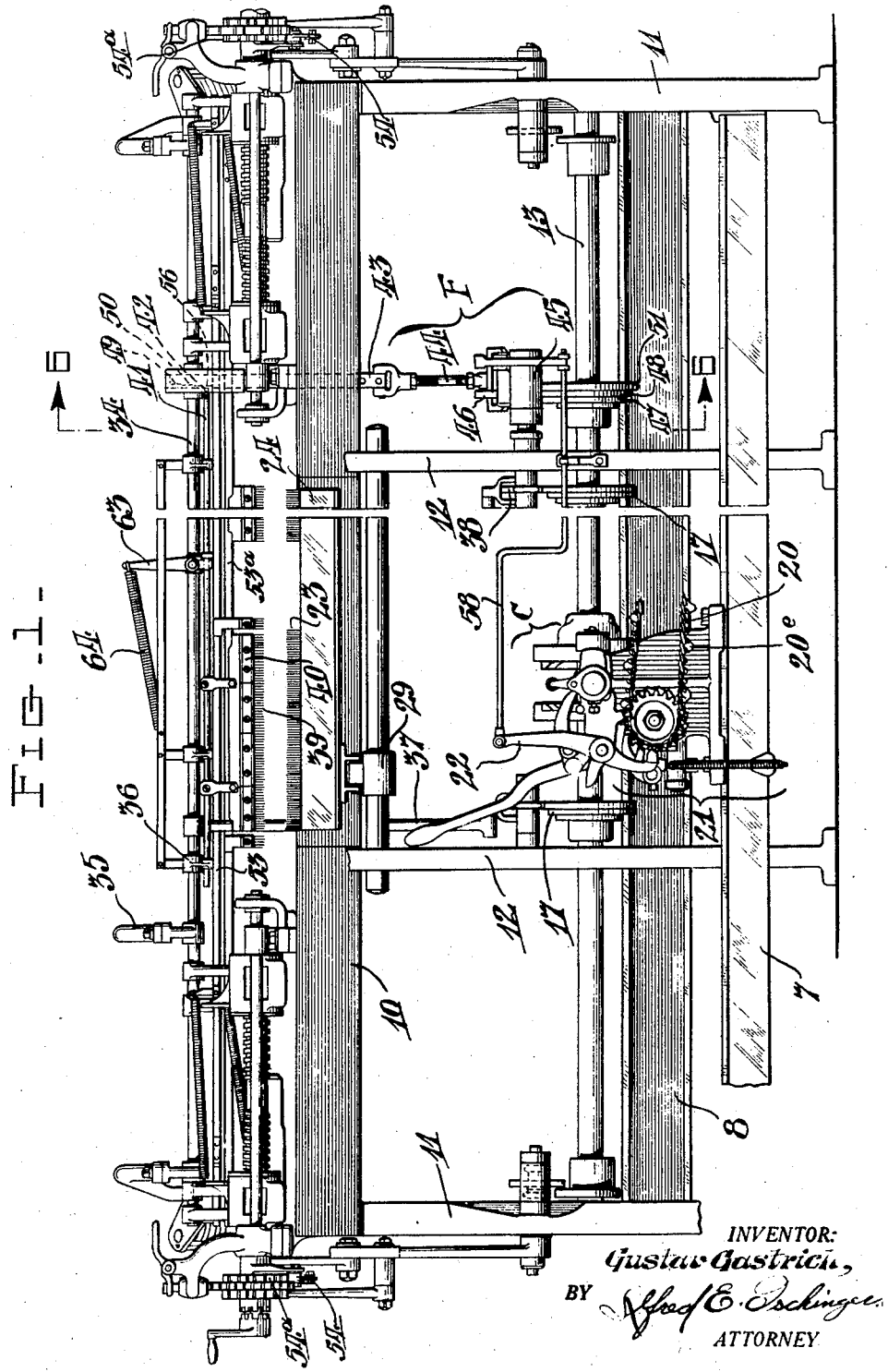

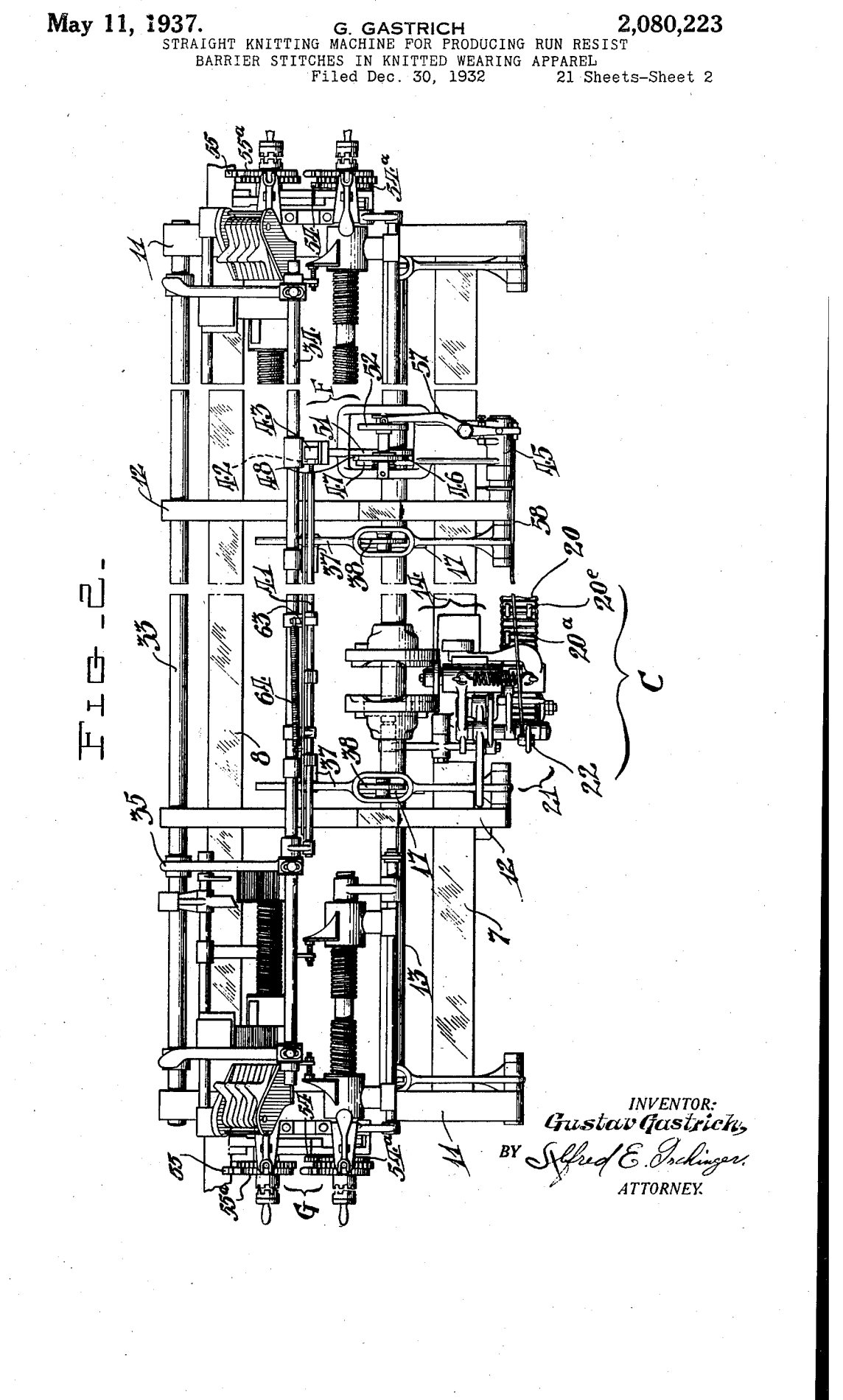

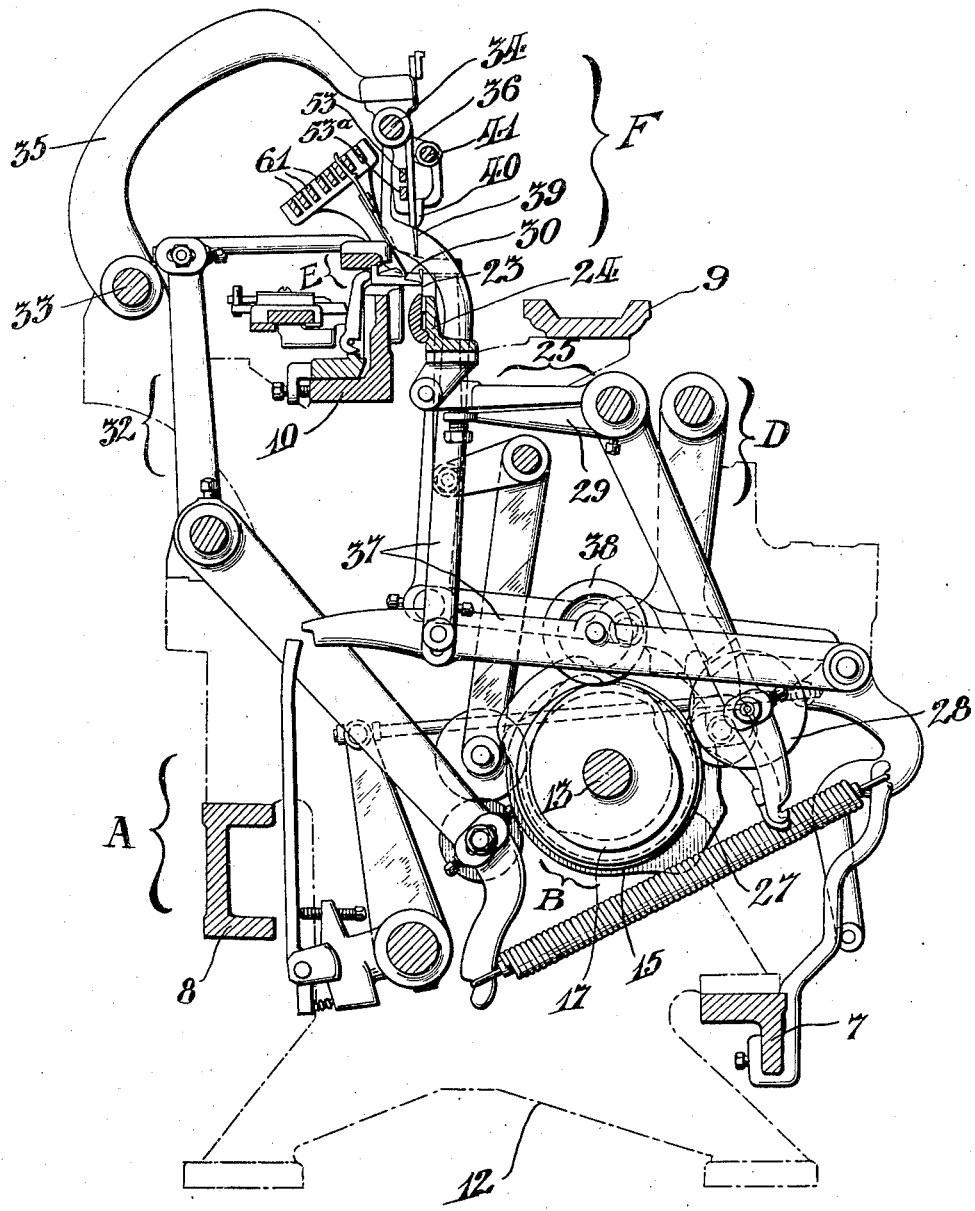

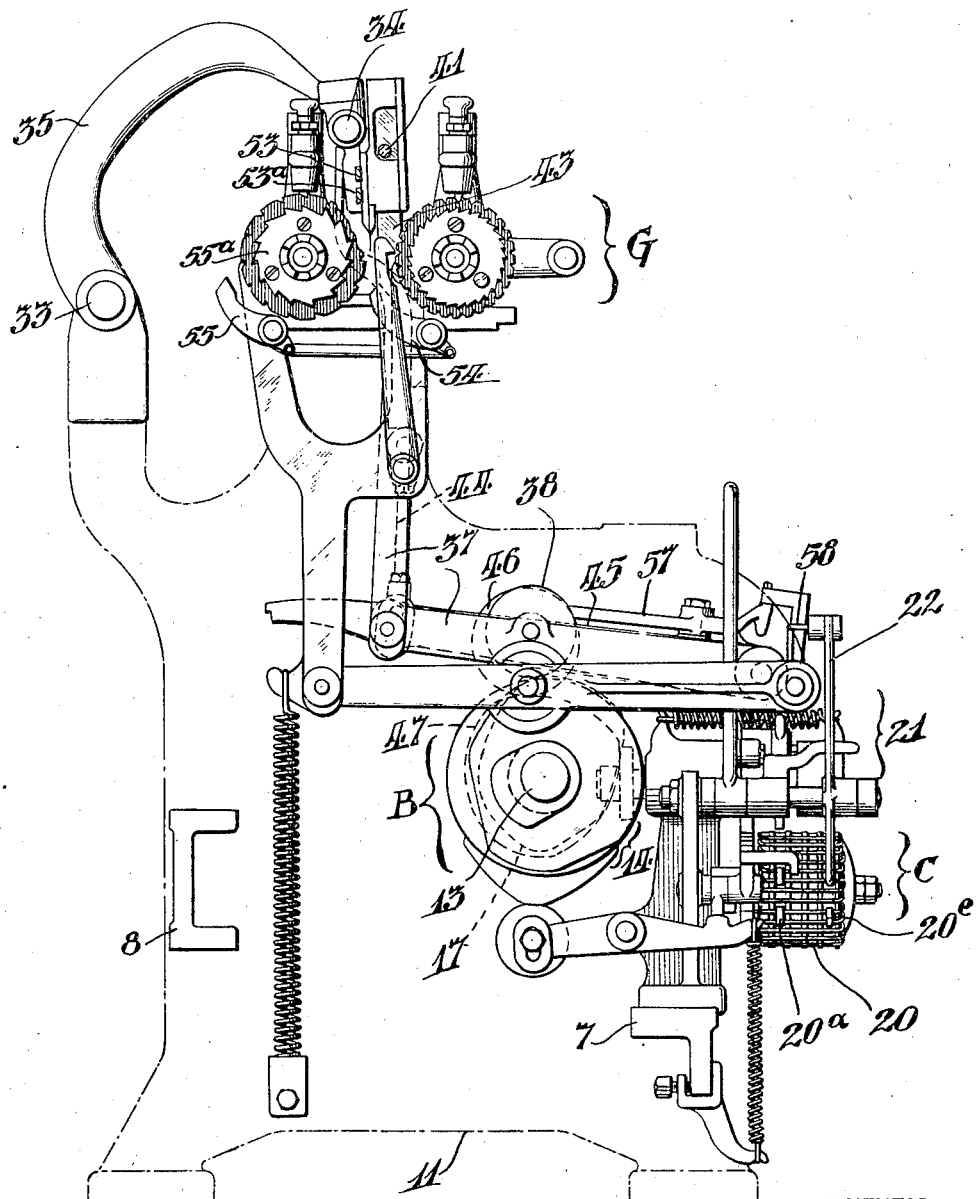

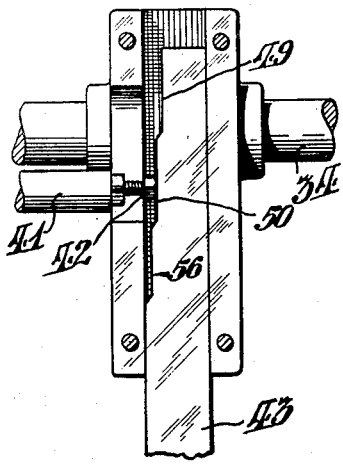
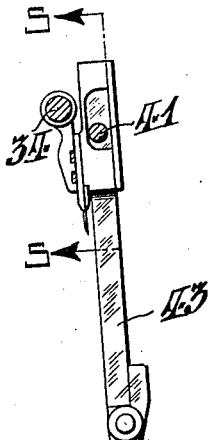
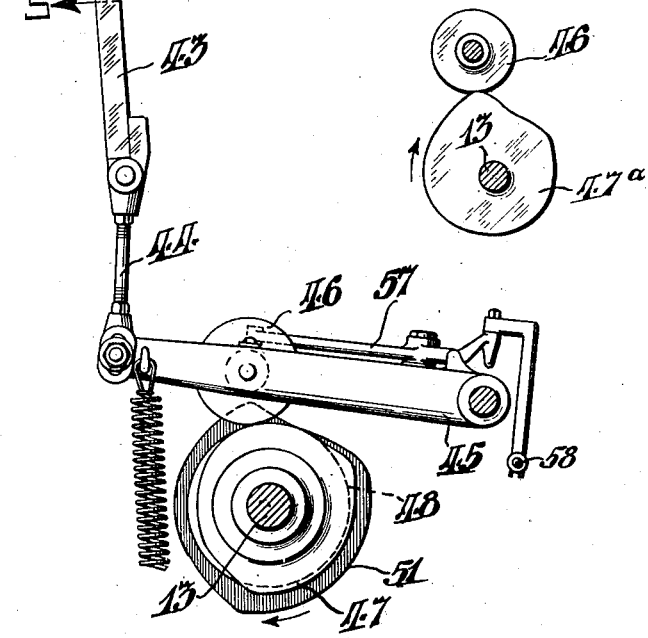
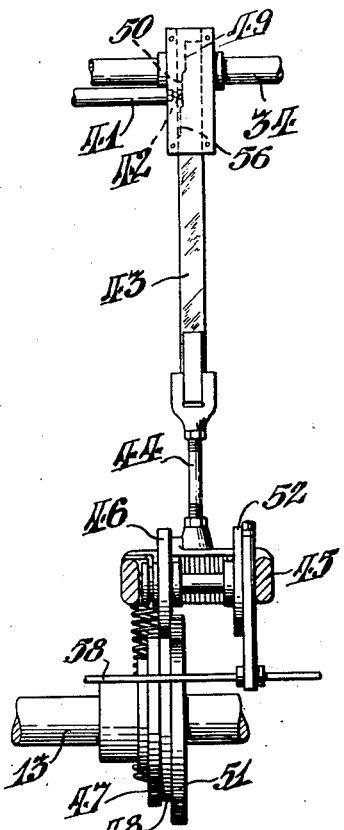

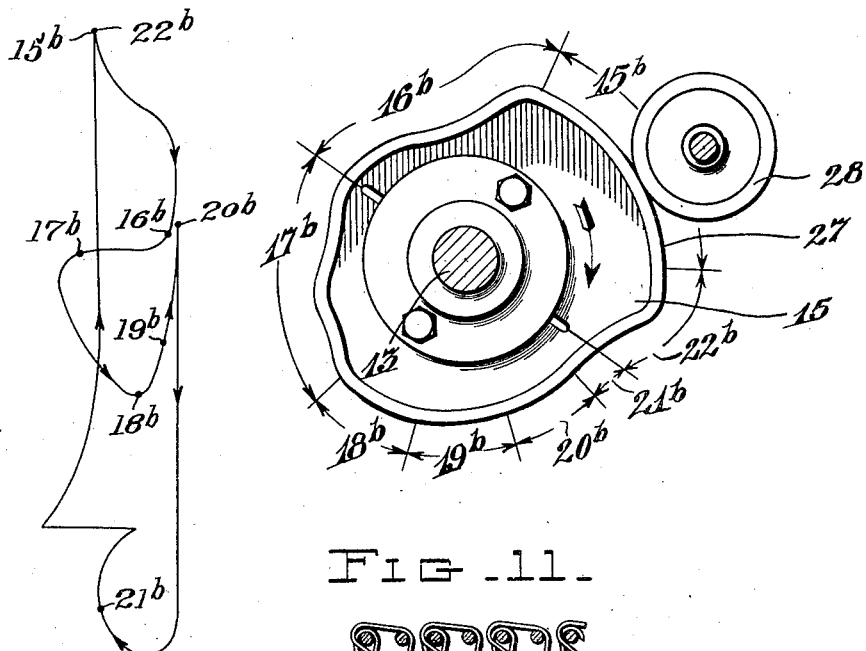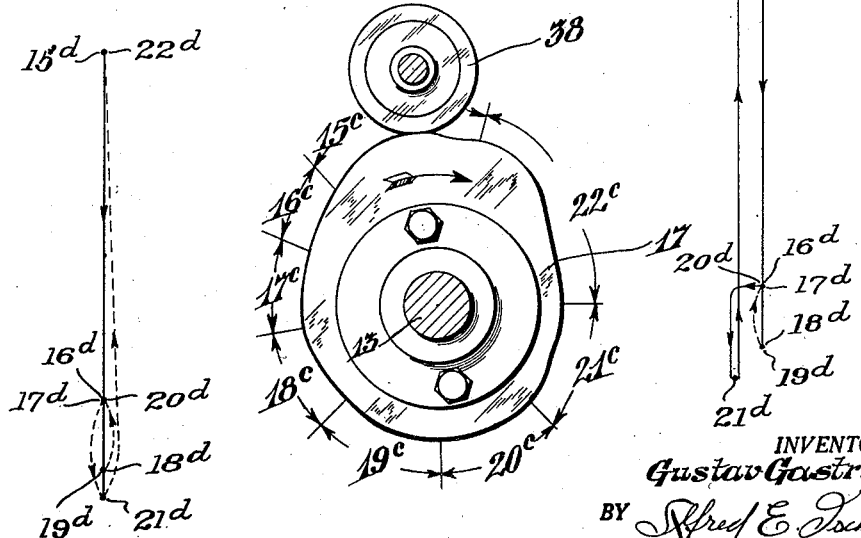

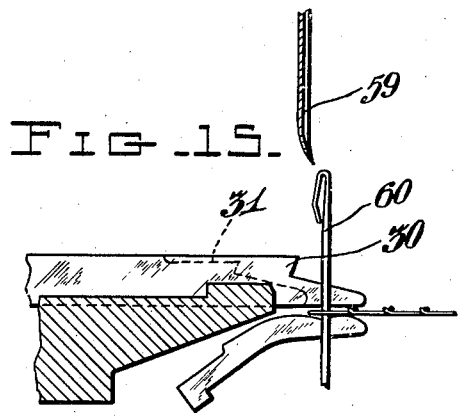
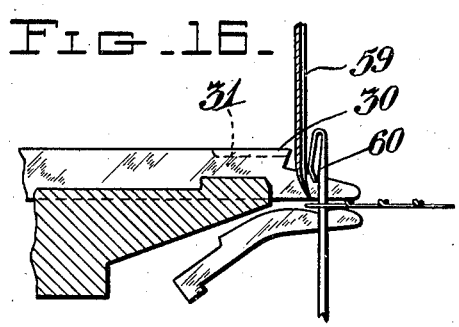
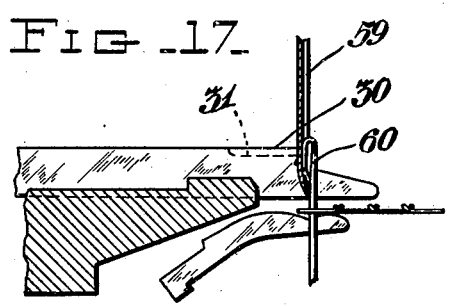
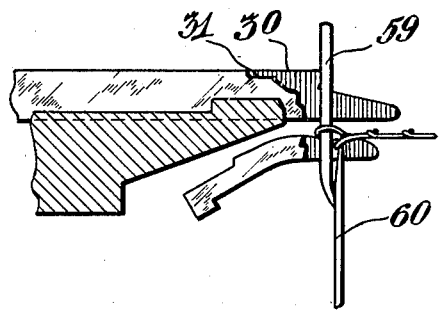
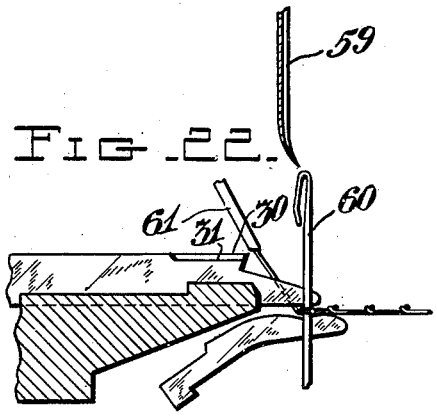

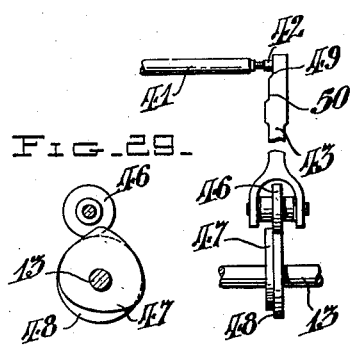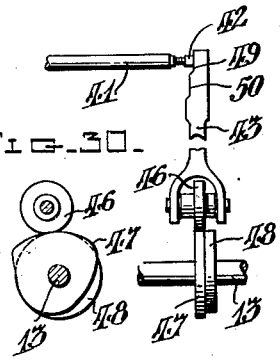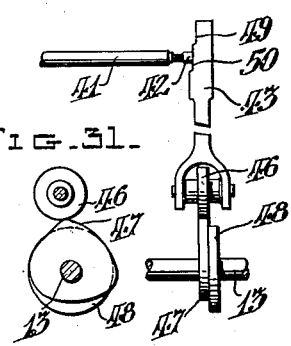
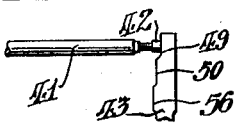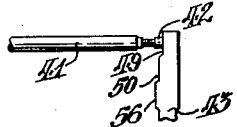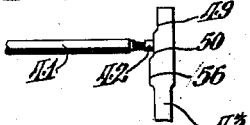
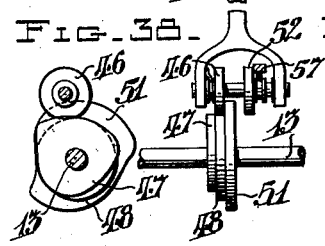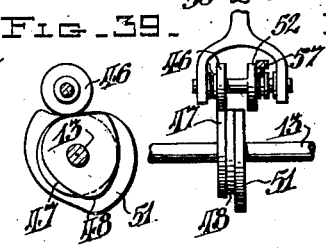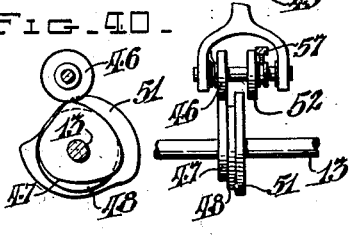
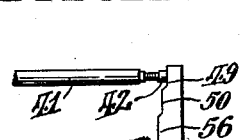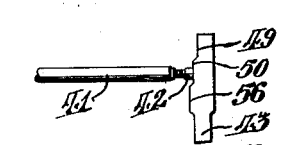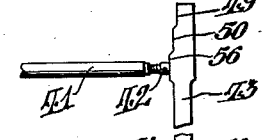
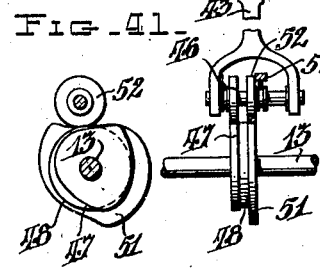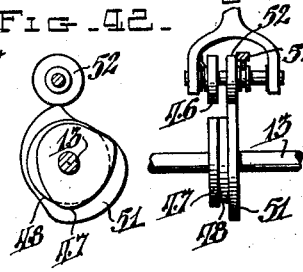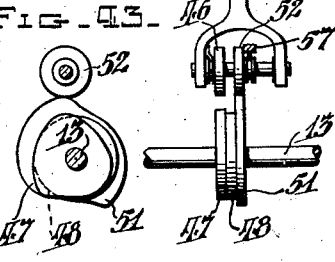

May 11, 1937.  G. GASTRICH  2,080,223
STRAIGHT KNITTING MACHINE FOR PRODUCING RUN RESIST
BARRIER STITCHES IN KNITTED WEARING APPAREL
Filed Dec. 30, 1932  21 Sheets—Sheet 10

INVENTOR:
Gustav Gastrich,
BY Alfred E. Ischinger
ATTORNEY.

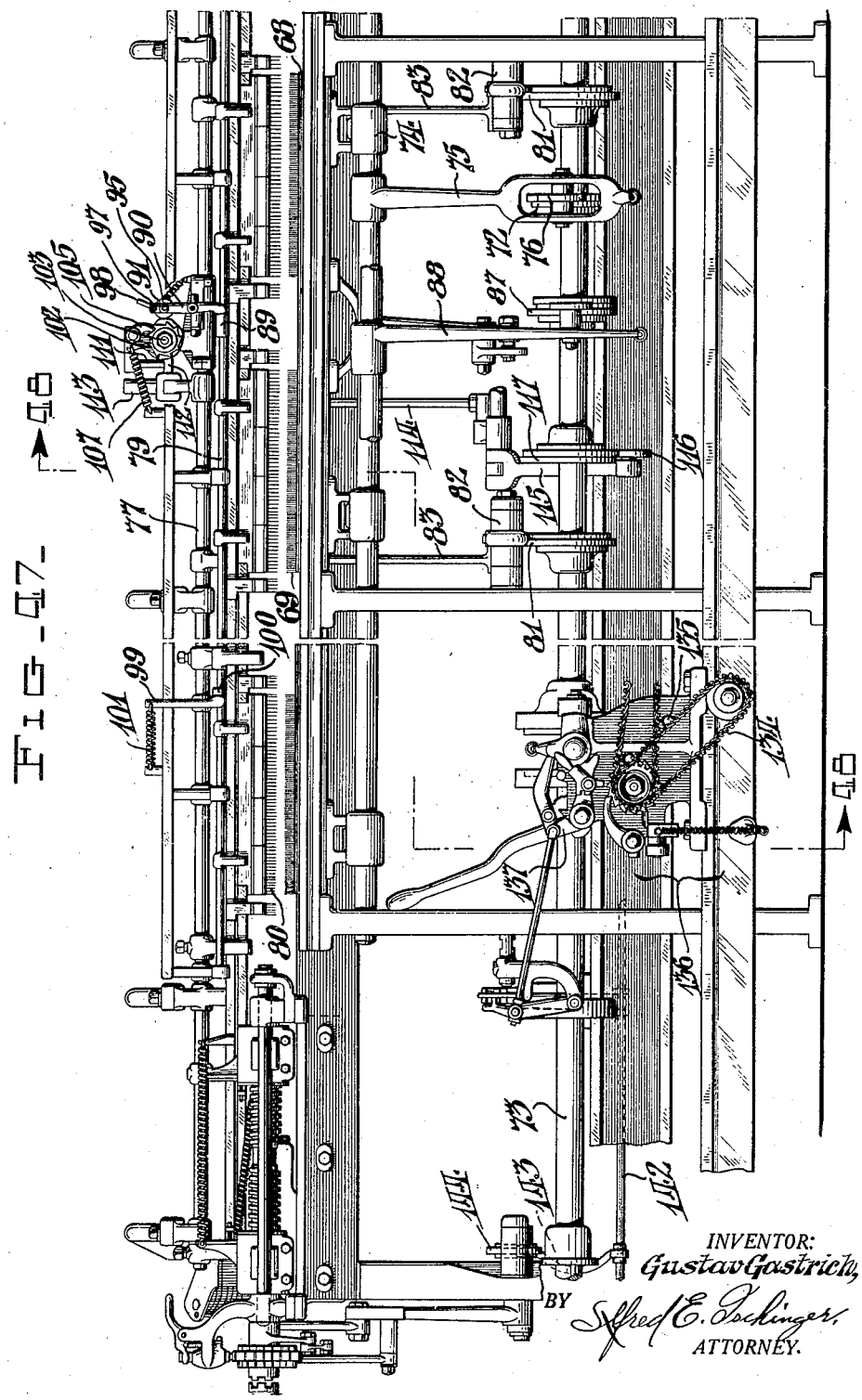

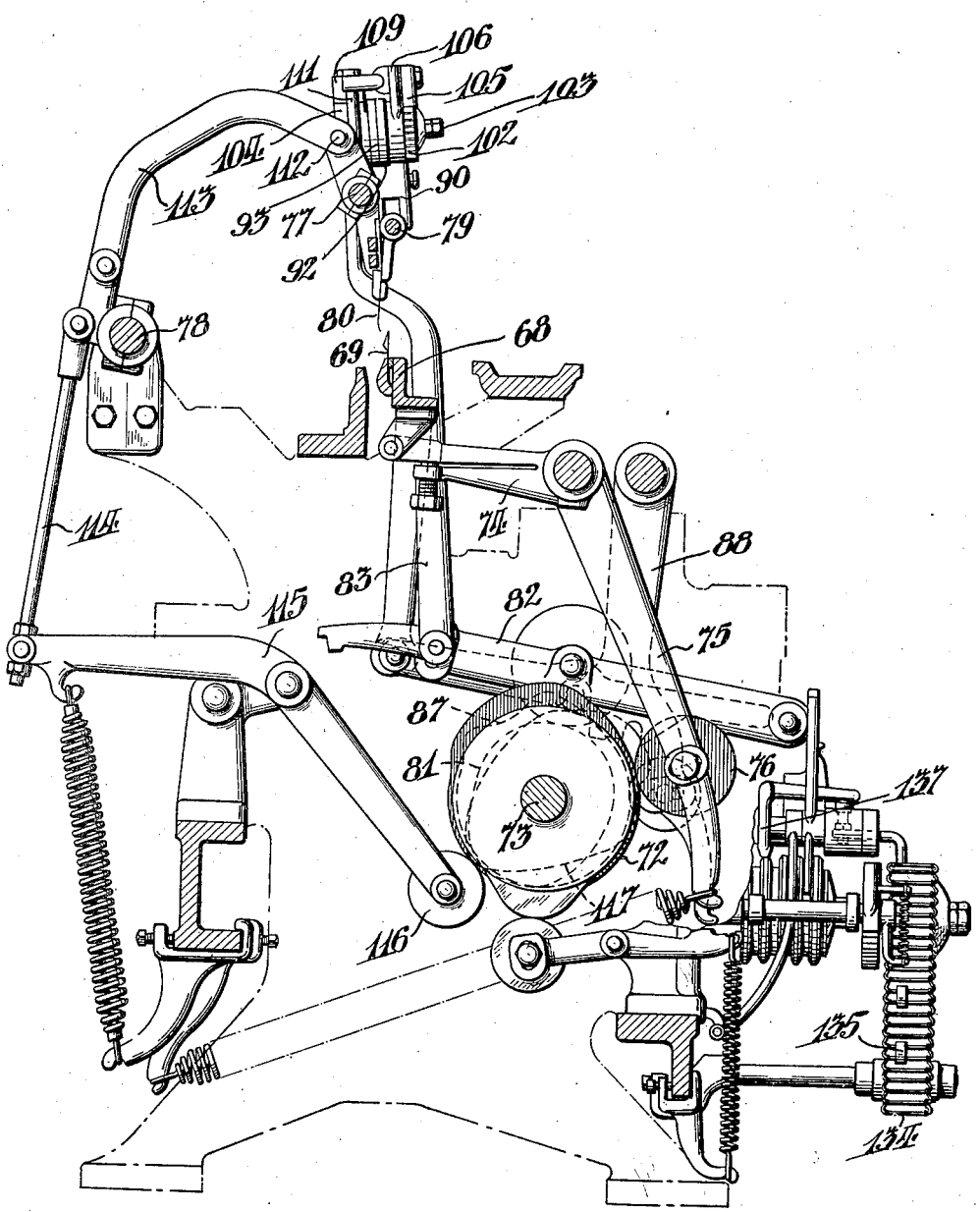

May 11, 1937.　　　　　G. GASTRICH　　　　　2,080,223
STRAIGHT KNITTING MACHINE FOR PRODUCING RUN RESIST
BARRIER STITCHES IN KNITTED WEARING APPAREL
Filed Dec. 30, 1932　　　21 Sheets-Sheet 13
FIG_49_
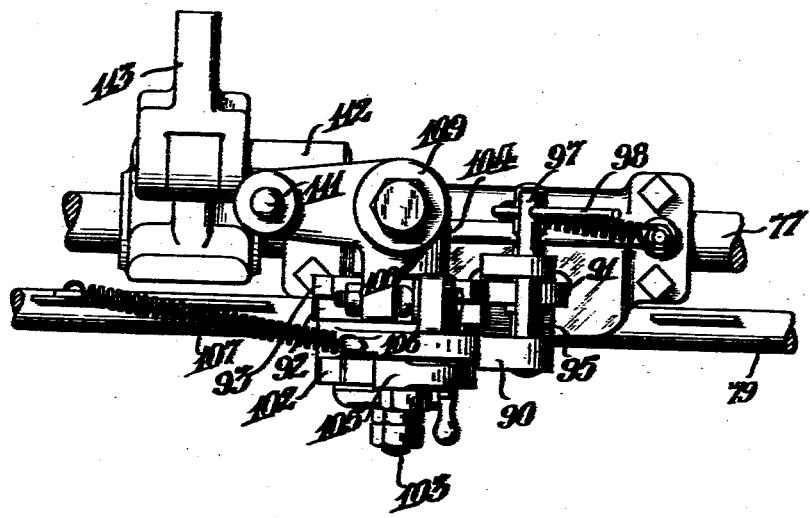
FIG_50_
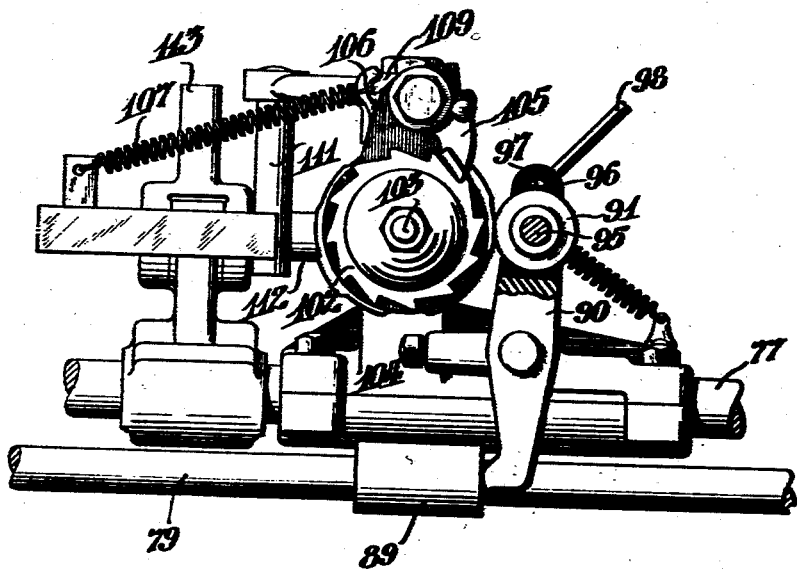
INVENTOR:
Gustav Gastrich,
BY
ATTORNEY.

May 11, 1937. G. GASTRICH 2,080,223
STRAIGHT KNITTING MACHINE FOR PRODUCING RUN RESIST
BARRIER STITCHES IN KNITTED WEARING APPAREL
Filed Dec. 30, 1932 21 Sheets-Sheet 14
FIG_51_
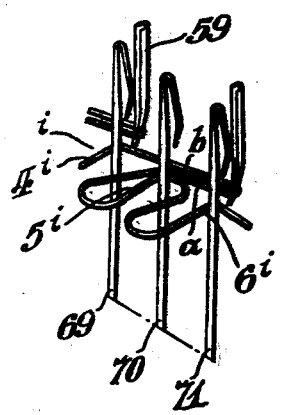
FIG_52_
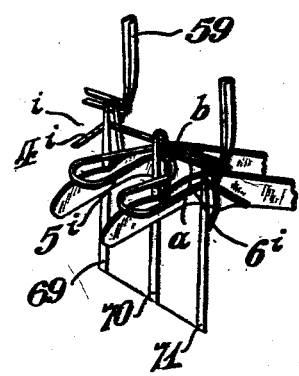
FIG_53_
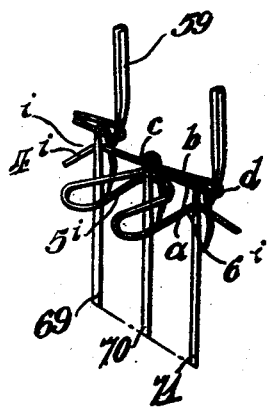
FIG_54_
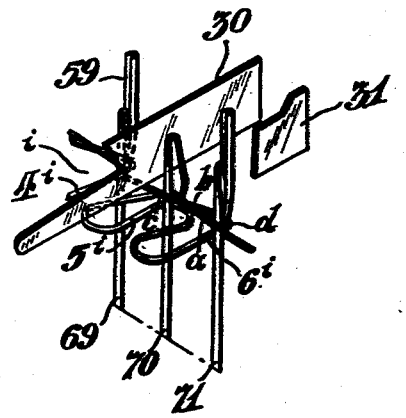
INVENTOR:
Gustav Gastrich,
BY
ATTORNEY.

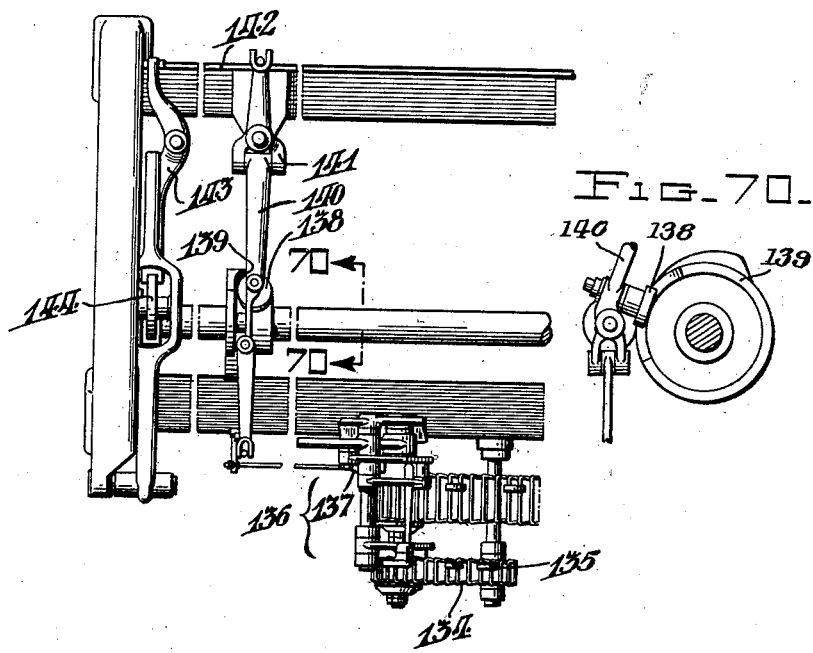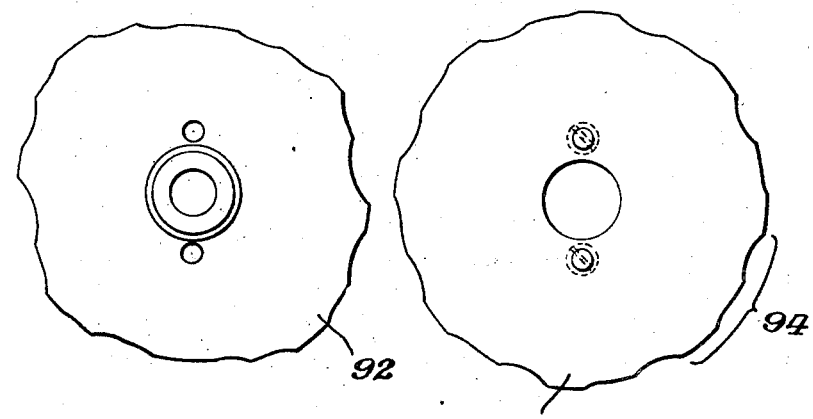

FIG_57.
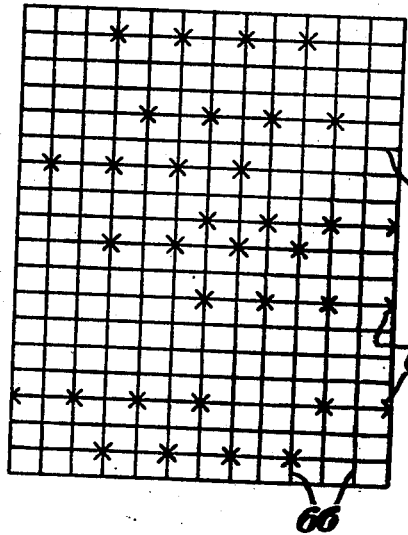
FIG_58.
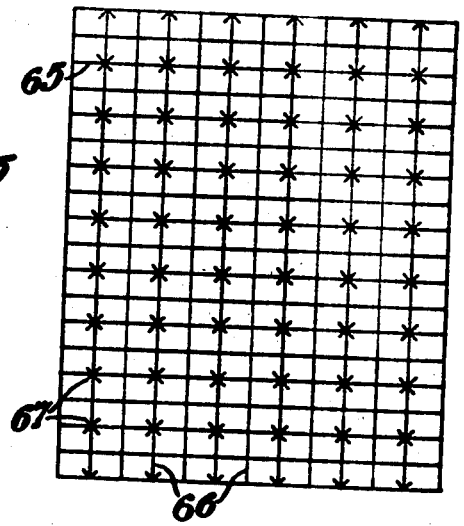
FIG_59.
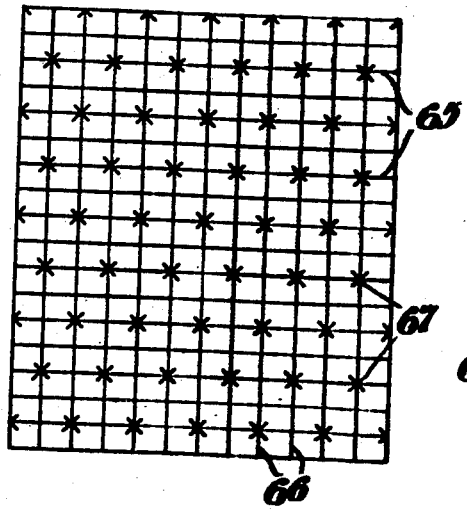
FIG_60.
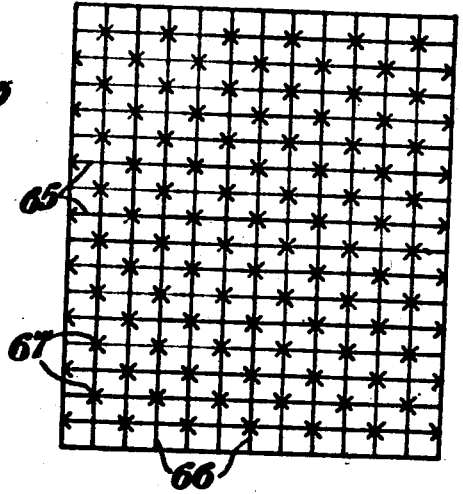

May 11, 1937.     G. GASTRICH     2,080,223
STRAIGHT KNITTING MACHINE FOR PRODUCING RUN RESIST
BARRIER STITCHES IN KNITTED WEARING APPAREL
Filed Dec. 30, 1932     21 Sheets-Sheet 17

INVENTOR:
Gustav Gastrich,
BY
ATTORNEY.

INVENTOR:
Gustav Gastrich,
BY Alfred E. Tschinger
ATTORNEY.

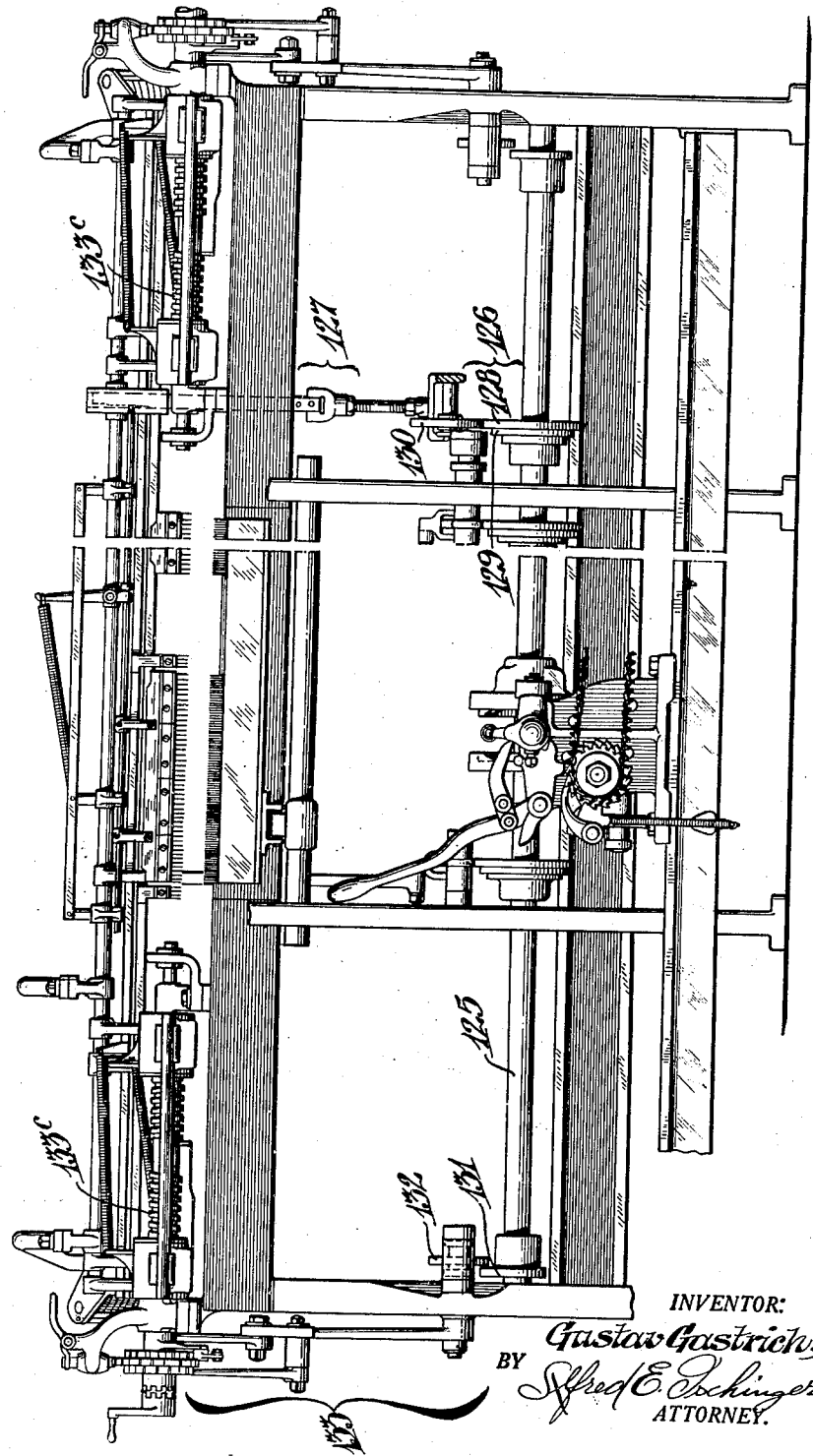

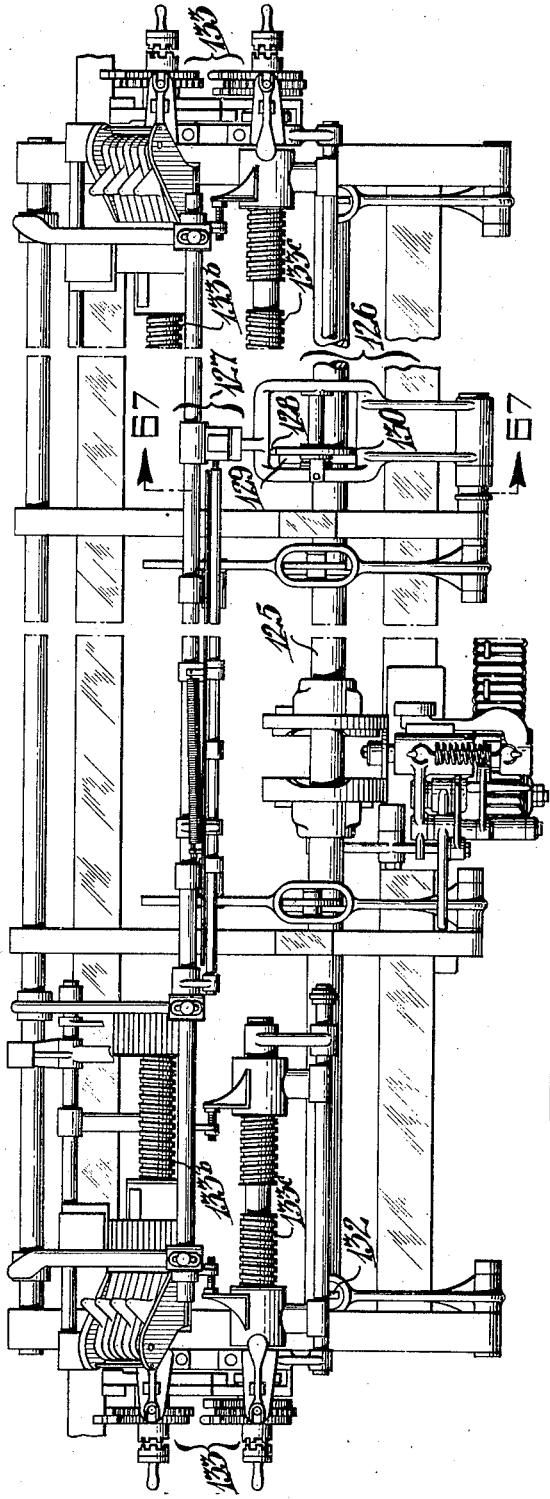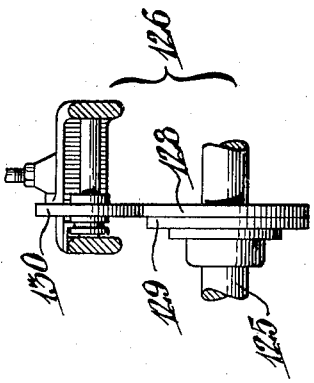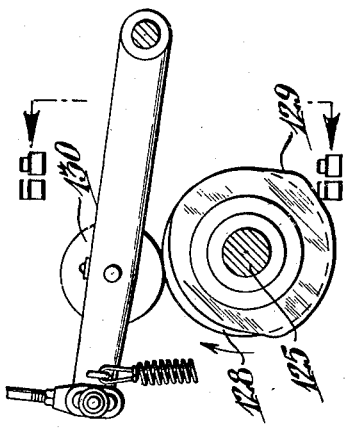

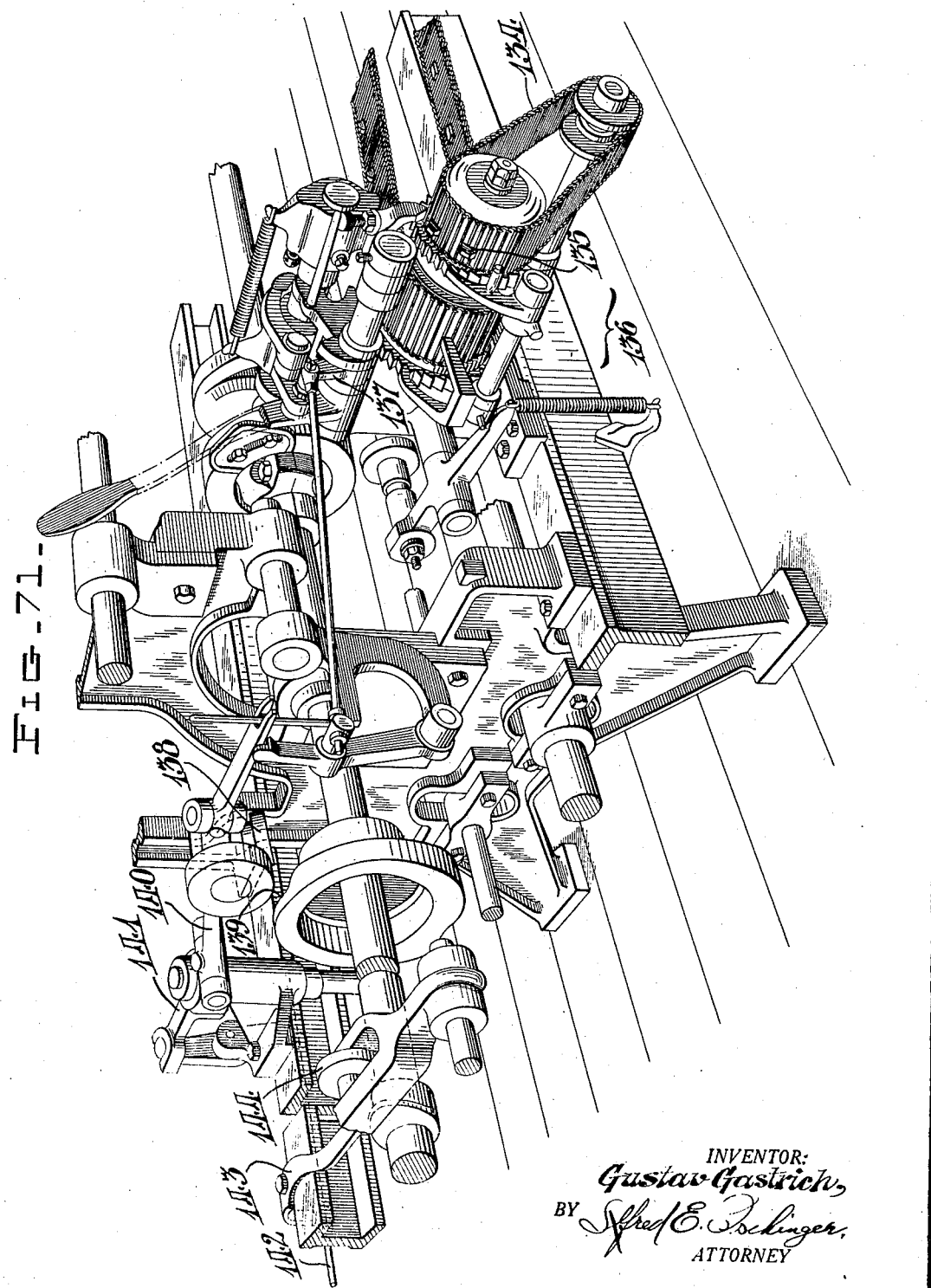

Patented May 11, 1937

2,080,223

UNITED STATES PATENT OFFICE 2,080,223

STRAIGHT KNITTING MACHINE FOR PRODUCING RUN-RESIST BARRIER STITCHES IN KNITTED WEARING APPAREL

Gustav Gastrich, Wyomissing, Pa., assignor to Textile Machine Works, Wyomissing, Pa., a corporation of Pennsylvania Application December 30, 1932, Serial No. 649,546

10 Claims. (Cl. 66—9b)

This invention relates to a novel method of producing special stitches, for example, barrier stitches or interlocking loops, in full fashioned stockings or other articles of wearing apparel; and to mechanisms particularly adapted for use in straight knitting machines for automatically incorporating such stitches in a great variety of specifically different forms, positions, arrangements and combinations in the knitted articles produced thereby.

An object of the invention is the provision of a knitting machine that will produce spread, displaced or distorted interlocking loops disposed in an unsymmetrical or non-uniform manner over a fabric to give various desired appearances or characteristics thereto, or will produce interlocking loops disposed over restricted areas of the fabric in such manner as to give "run resist" or "non-run" properties thereto, and will produce an entirely non-run or run resist fabric by properly positioning interlocking loops over the entire area of the fabric to obtain the desired characteristic.

Another object of the invention resides in modifying or changing certain mechanisms of a full fashioned stocking knitting machine to enable the same to spread loops over two or more needles, to produce interlocking loops and position the interlocking loops in various combinations and arrangements with or without plain knitted loops to give run resist or non-run properties to a fabric.

Another object of the invention resides in the automatic control of the various mechanisms so that the spread interlocking loops may be formed in every course, or in alternate courses, or in variably spaced courses to prevent runs from extending in any direction.

A further object of my invention resides in the provision of mechanisms that will form spread loops and alternate their position walewise of the fabric so as to positively prevent runs from extending in any wale of the fabric.

Another feature of the invention resides in actuating the companion mechanisms in such manner that the knitting needles will function in proper time relation with the point mechanism to obtain various forms of interlocking loops and to vary their direction of spread over two or more needles, and to selectively position the loops either below or under the beards of certain of the needles during the spreading operation, for the purpose of extending the loops over two or more wales of the fabric.

My invention is also distinguished in that the same mechanism may function to knit plain fabrics, run resist fabrics, ornamental fabrics, non-run fabrics, or any desired combination thereof.

A still further object of the invention is to modify certain component parts of a well known type of knitting machine so that they may accurately cofunction to spread a loop and interlock the same with associated loops in the production of a full fashioned stocking.

This application is a continuation in part of the divisional subject matter set forth in my co-pending applications, Serial No. 609,837, filed May 7, 1932, and Serial No. 623,206, filed July 18, 1932.

With these and other objects in view, which will become apparent from the following detailed description of several illustrative embodiments of the invention shown in the accompanying drawings, my invention resides in the novel methods, elements of construction, mechanisms and combination of parts in cooperative relationship, as hereinafter more particularly pointed out in the claims.

In the drawings:

Figure 1 is a partial front elevational view of a full fashioned stocking knitting machine embodying my invention.

Fig. 2 is a top plan view of the machine shown in Fig. 1.

Fig. 3 is a vertical cross-sectional view of the machine.

Fig. 4 is an end elevational view of the machine.

Fig. 5 is a vertical sectional detail view along the lines 5—5 of Fig. 6 showing one of the cam members employed in the lock stitch mechanism.

Fig. 6 is a detail sectional view of the actuating cams and associated elements, taken substantially along the lines 6—6 of Fig. 1.

Fig. 7 is a front view, partly in section, of the mechanism of Fig. 6.

Fig. 8 is a detail view of a cam member adapted for use in connection with the mechanism of Fig. 6.

Fig. 9 is a side elevational view of the needle cam.

Fig. 10 is a side elevational view of the point cam.

Fig. 11 is a diagrammatic view of one form of spread loops producible with the mechanism of my invention.

Fig. 12 is a diagram of the path of travel of each needle.

Fig. 13 is a diagram illustrating an end view of the path of travel of a point.

Fig. 14 is a diagram illustrating a front view of the point movement.

Figs. 15 to 22 illustrate various positions of a point and needle during one cycle of operation.

Figs. 26 to 31 illustrate diagrammatically various positions of the point rod shifting cams and associated elements, in accordance with one form of the invention, during one cycle of operation of the rod shifting mechanism.

Figs. 32 to 43 illustrate diagrammatically various positions of the point rod shifting cams and associated elements, in accordance with another form of the invention, during an operating cycle of the rod shifting mechanism.

Fig. 47 is a partial front elevational view of a full fashioned knitting machine embodying a modified form of my invention.

Fig. 48 is a cross-sectional view, taken substantially along the line indicated by the arrows 48—48 in Fig. 47.

Figs. 49 and 50 are detail views of the type of the point rod actuating mechanism illustrated in Figs. 47 and 48.

Figs. 51 to 54 illustrate the relative position of the needles and points of the machine shown in Figs. 47 and 48 in producing another form of interlocking stitch.

Figs. 55 and 56 are views of the point rod shifting cams as used in the machine illustrated in Figs. 47 and 48.

Fig. 57 is a diagrammatic view illustrating the interlocking loops scattered unsymmetrically over the fabric.

Fig. 58 is a diagrammatic view illustrating the interlocking loops arranged over the fabric in a symmetrical manner to produce a run resist fabric.

Fig. 59 is a diagrammatic view illustrating the interlocking loops arranged over the fabric and in every wale but arranged in staggered relationship in alternating courses to produce a run proof fabric.

Fig. 60 is a diagrammatic view illustrating the interlocking loops arranged in every wale and in every course to produce a run proof fabric.

Fig. 61 is a side elevation of a stocking provided with two interlocking or barrier courses.

Fig. 62 is an enlarged diagrammatic view of the portion of the stocking indicated by the dot-and-dash line in Fig. 61.

Fig. 65 is a partial front elevational view of a full fashioned knitting machine embodying a modified form of point rod operating mechanism in accordance with my invention.

Fig. 66 is a top plan view of the machine illustrated in Fig. 65.

Fig. 67 is a detail cross-sectional view taken substantially on the line 67—67, Fig. 66.

Fig. 68 is a sectional view taken on the line 68—68, Fig. 67.

Fig. 69 is a plan view of an automatic narrowing control device adapted for use on conjunction with certain mechanisms of my invention.

Fig. 70 is a detail sectional view taken on line 70—70, Fig. 69.

Fig. 71 is a perspective view of the pattern mechanism for automatically controlling the narrowing device and including the mechanism shown in Fig. 69.

Figure 18:
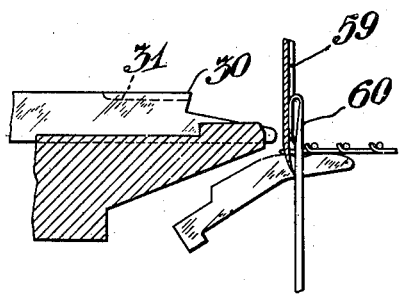

Referring to the drawings, it will be noted for the sake of clearness I have only illustrated detail parts of certain mechanisms of the well known Reading type of machine that cofunctions with my improved mechanisms for the production of my novel type of fabric. Therefore, my invention is illustrated and described basically in comprising a frame A; a power mechanism B; a chain pattern motion mechanism C; a needle bar mechanism D; a sinker and divider mechanism E; a lock stitch motion mechanism F; and narrowing mechanism G.

Referring to the type of fabric shown in Fig. 62, it will be noted that the fabric as produced on my machine comprises plain courses 1 and interlocking or barrier courses 2 which in this particular showing alternate with each other, but I wish it to be understood that any number of plain courses may succeed each other and any number of interlocking courses may succeed each other and in fact every course may be an interlocking course. The plain courses 1 are formed from plain loops 3 and the interlocking courses consist of alternate plain loops 4 and spread interlocking loops 5, or may be formed entirely of spread interlocking loops. In producing the interlocking loops, I first form a course of plain loops and then selected loops which may be every loop, but preferably alternate loops, are each spread, displaced or distorted from the wale in which it originates into an adjacent wale and in the adjacent wale the bight 6 of each spread loop engages under a needle loop and over the associated sinker loop so that the bight will be gripped between a needle wale loop and a sinker wale loop as clearly shown in Fig. 62. In the forming of the spread loops I have found it economical procedure to spread the loop from the needle originally forming the loop onto an adjacent needle or adjacent needles and to accomplish this economically and practically, I have designed the machine which is the subject matter of the present application.

Frame A

The frame A (Figs. 3 and 4) is of the well known construction including the front and back beams 7 and 8, front and center beds 9 and 10 and end and center frames 11 and 12.

Power mechanism B

The power mechanism B comprises the power shaft 13 associated with a common form of shifting device 14 manipulated by the chain pattern motion mechanism hereinafter described. Also connected to the power shaft 13 is a needle cam 15, point cam 17 and pattern cams 47 and 51. The cam shaft is operated by a prime mover such as an electric motor through a suitable clutch connection not shown but well known in the art.

Chain pattern motion mechanism C

The chain pattern motion mechanism C preferably comprises a pattern chain 20 having buttons 20a for controlling the knitting operations of the machine and cofunctions with the shifting device 14 to shift the shaft 13 for the performing of narrowing operations. The chain 20 further controls the operation of the pattern control mechanism 21 for the selective actuation of the machine in a manner well known in the art. The pattern control mechanism 21 includes a shiftable lever 22 periodically operated by buttons 20e on the pattern chain 20 for selectively controlling the operation of parts of the lock stitch motion mechanism hereinafter described.

Needle bar motion mechanism D

My needle bar motion mechanism D is constructed along lines identical with the type of needle bar motion mechanism now used in the construction of the Reading design of full fashioned knitting machines with the exception that the shape of the cam 15 is somewhat changed to enable an increase in the height of elevation of the needles for accomplishment of an objective hereinafter set forth. The row of needles 23 of each knitting section is supported by its associated needle bar 24 and this needle bar is given the usual vertical motions by the actuating device 25. The needle actuating device 25 has been somewhat redesigned, that is to say, the cam 15 thereof has a portion of its peripheral surface 27 arranged closer to the center of the power shaft 13 than is customary in the usual type of needle cam installed in the construction of full fashioned knitting machines heretofore employed. This enables the needle actuating device 25 to move in closer to the center of the power shaft 13 thereby elevating the row of needles to a greater height than is customary to enable a lower point of engagement between the points and the needles for the purpose hereinafter described. As is well known, the needle actuating device 25 includes a roller 28 for travel on the curved peripheral surface 27 of the cam 15 to vary the rocking motion of the arm 29 that is directly connected to the needle bar 24. The peripheral contour of the cam surface 15 is such as to time the movements of the row of needles 23 to properly coact with the lock stitch motion mechanism, hereinafter described to enable the interlocking engagement of predetermined loops by selected needles and the spreading of such loops over adjacent needles.

Sinker and divider mechanism E

The sinker and divider mechanism is also of the usual construction comprising the usual sinkers 30 and dividers 31 operated by a well known operating mechanism 32 in proper time relation to enable the needles to properly form loops and further function with the lock stitch mechanism hereinafter described to allow spreading if predetermined loops over a predetermined number of adjacent needles.

Lock stitch motion mechanism F

The lock stitch motion mechanism F involves various parts or devices cofunctioning with the mechanism hereinbefore described to engage certain loops and spread the same over predetermined adjacent needles throughout the entire length of certain courses, thereby producing a plurality of interlocking courses or barrier courses in the fabric to prevent the passage of "runs". The lock stitch motion mechanism broadly includes parts of the usual narrowing mechanism of the full fashioned knitting machine including the rear narrowing shaft 33, front narrowing shaft 34 and arms 35 for rocking the frame 36 of the narrowing mechanism about the shaft 33 in the well known manner. Levers 37 carrying a roller 38 cofunctioning with the narrowing cam 17 on the power shaft 13 impart the necessary vertical movement to shaft 34 of the narrowing mechanism. The cam 17 is slightly redesigned having the general outline shown in Fig. 10 and will be described in detail when setting forth the operation of the mechanism. The points 39 are mounted in a row on a bar 40 attached to a shiftable rod 41 directly carried by the front narrowing shaft 34. This rod 41 carries a follower 42 cofunctioning with a slidable cam block 43, Figs. 5 to 7, the rod 41 being progressively shifted horizontally in the vertical sliding movement of the cam block as shown diagrammatically in Figs. 26, 27 and 28, and Figs. 32 to 37. Figs. 29 to 31, and 38 to 43, are side views of the rotary cams of Figs. 26 to 28, and 32 to 37, respectively.

The cam block 43 is connected by means of rod 44 to a pivoted lever 45 that carries a roller 46 cofunctioning with the actuating cam 47 and an idle cam 48. Referring to Figs. 26, 27 and 28, it will be noted that when the roller 46 is on the idle cam 48, the follower 42 rests against the neutral cam face 49, but when the cam shaft 13 is shifted longitudinally (to the right as viewed in Fig. 1) in the usual manner by the shifting device, and roller 46 engages with cam 47, the cam face 50 is moved into engagement with the follower 42 due to rotation of the cam shaft and the peripheral formation of cam 47. Thus, it will be appreciated that the cam 47 moves the cam block 43 upwardly a distance great enough to give a single shifting movement to the point rod 41 to the left. This particular movement enables a selected loop to be spread to an extent to engage around companion needles, the distance of spreading the loop depending upon the relative offset positions of cam face 49 and cam face 50. The cam action just described enables me to spread and interlock loops in scattered positions over the fabric or in selected wales, but for the purpose of systematically staggering the spread loops in selected courses and in every wale of the fabric, the block 43 is given additional movements as shown in Figs. 32 to 43 inclusive. I provide automatic means for shifting parts of the cam mechanism of the point mechanism in contradistinction to the sole use of the shaft 13 in the shifting thereof to actuate the block 43. It is, of course, to be understood that during the formation of the spread loops, any well known type of manual or automatic control can be utilized to prevent functioning of those parts of a full fashioned machine that control the travel of the yarn carriers and movements of the narrowing points and other parts of the machine peculiar to the narrowing operation, as hereinafter set forth.

In Figs. 32 to 43, I retain the actuating cam 47 and the idle cam 48 and I provide a second actuating cam designated by the numeral 51 and this second actuating cam 51 has its peripheral surface so designed as to elevate the block 43 to an increased height in relation to the elevation thereof by cam 47. The roller 46 functions with the cams 47 and 48 in the shifting of the shaft 13 as described in relation to the cam mechanism illustrated in Figs. 26, 27 and 28 but in addition to the roller 46, I provide a second roller 52 slidably supported by the arm 45 so as to move into and out of active engagement with the cam 51. The cam block 43 illustrated in Figs. 32 to 43 is provided with the neutral cam face 49, the first active cam face 50 and a second active cam face 56 horizontally offset the required distance to accurately and progressively shift the point rod 41 for spreading loops and alternating the position of the spread loops in succeeding courses thereby placing spread loops in every wale of the fabric and making the fabric absolutely run proof.

In the operation of the device shown in Figs. 32 to 43, the points are lowered into engagement with selected loops and then the cam 47 moves the cam block to a height great enough to bring about engagement of cam face 50 with the follower of the point rod thereby spreading the loops engaged therewith. After this has been accomplished, the spread loops are placed upon spaced needles, and in a succeeding barrier course the points are moved into engagement with a new set of plain loops and then the roller 52 is shifted into engagement with cam 51 which moves the block 43 to an increased elevation for bringing about engagement of the cam face 56 with the follower of the point rod thereby enabling the spreading of additional loops. In other words, the point rod is progressively moved to the left to two positions in contradistinction to the movement of the point rod to a single position by the mechanism shown in Figs. 26, 27 and 28. More specifically stated, the mechanism illustrated in Figs. 26, 27 and 28 only spreads loops whereas the mechanism shown in Figs. 32 to 43 not only spreads loops but alternates the position of the spread loops in succeeding courses.

Any suitable mechanism may be utilized for shifting the roller 52 into and out of active position in relation to the cam 51, but for the purpose of illustration, I have shown in Figs. 1 and 2 the usual type of shifter comprising a pivoted arm 57 having one end loosely engaging the roller 52 for the shifting thereof and its other end pivotally connected to a link device 58 pivotally connected to the arm 22, the latter operated in a manner heretofore described. At this point, I wish to stress the fact that the point mechanism and the actuating mechanism therefor will spread and interlock loops irrespective of the automatic control thereof and this spreading and interlocking of loops can be accomplished by the point mechanism in every other wale or in every wale depending upon the numerical relation of the points to the knitting needles, but for the purpose of producing a more practical machine, I have illustrated and described parts that will enable the automatic operation of the point mechanism with the knitting operations necessary in knitting a full fashioned stocking.

It is, of course, to be understood, that the cams 47 and 51 may be given various configurations and may be produced in different sizes depending upon the specific movements required of the point rod 41. I wish it also to be understood that the cams may be of a design to enable the point rod to spread loops to the left or to the right of the fabric and alternating the direction of spreading of the loops in alternate interlocking courses. In the operation of the shifting mechanism just described, the shaft 13 is shifted in the usual manner which brings the cam 47 into operative engagement with the roller 46 for giving the initial vertical sliding movement to the cam block 43 and when the cam block has performed its function of shifting the point rod to its first position, the roller 52 is shifted by the link device 58 through the manipulation of the lever 22 by the buttons 20e on the chain 20. This action brings roller 52 into operative engagement with cam 51 so that the cam block 43 can be elevated to its final position for shifting the point rod to its final position. It will be appreciated that the block 43 is given two progressively vertical movements which operation produces two horizontal progressive movements of the point rod.

Figure 23:
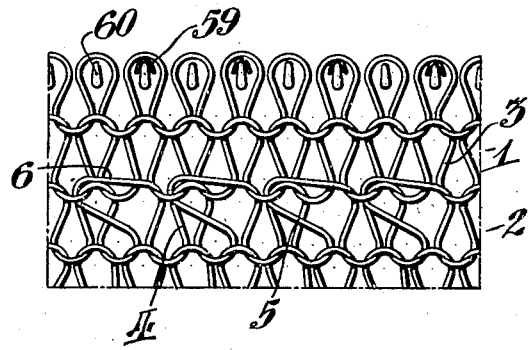
Fig. 23 is a diagrammatic plan view of the knitted fabric with the points and the needles associated therewith in the position illustrated in Fig. 18.
Figure 24:
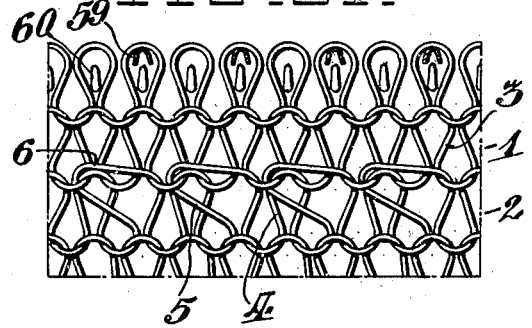
Fig. 24 is a diagrammatic plan view of the knitted fabric with the points and the needles associated therewith in the position illustrated in Fig. 19.
Figure 25:
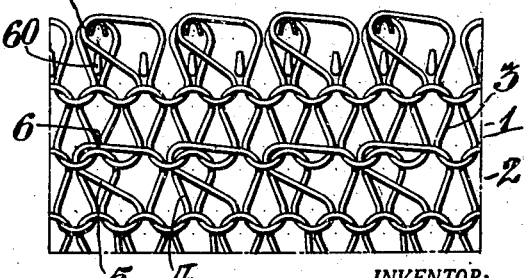
Fig. 25 is a diagrammatic plan view of the knitted fabric with the points and the needles associated therewith in the position illustrated in Fig. 20.
Figure 44:
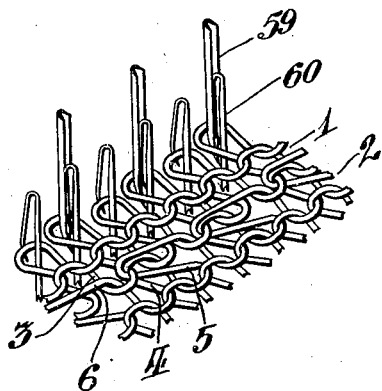
Fig. 44 is a diagrammatic perspective view illustrating the points in position to close the beards of the needles and engage predetermined loops.
Figure 45:
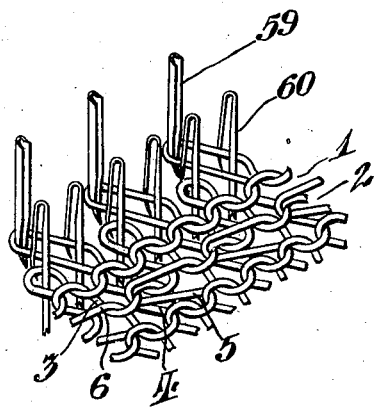
Fig. 45 is a diagrammatic perspective view of the points moved away from the needles for elongating the loops.
Figure 46:
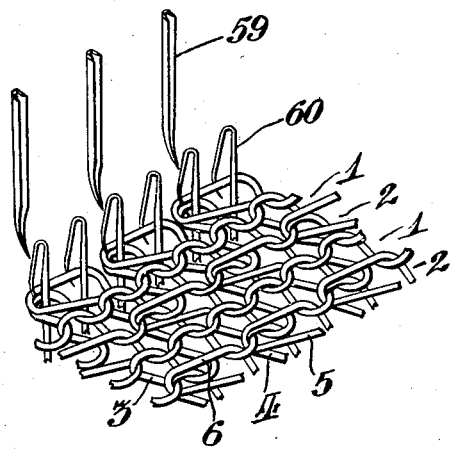
Fig. 46 is a diagrammatic view illustrating the loops spread to engage over companion needles.

In Figs. 15 to 22, I have illustrated in a more or less diagrammatic manner the relative movement of a single point 59 of the row of points and a single needle 60 of the row of needles. In Figs. 23, 24 and 25, I have shown the relative change in position of the points and needles in the formation of the spread loops, the points and needles being arranged within the loops of the last formed course of the fabric. In Fig. 15, I have illustrated the point 59 elevated above the needle in a manner well known in the art with the exception that in this particular position the needle 60 has been raised to a greater height due to the positioning of the peripherial surface of the cam 15 relative to the center of shaft 13. This is important as I have found it advantageous to lower the point of contact between the point and the shank of the needle to insure proper engagement of the loop with the point and the proper timing of relative movements between the needle and the point to enable the spread loop to engage under the beard of the needle.

Figure 19:
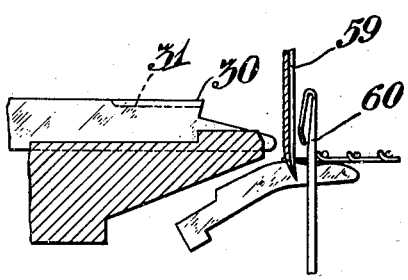
Figure 20:
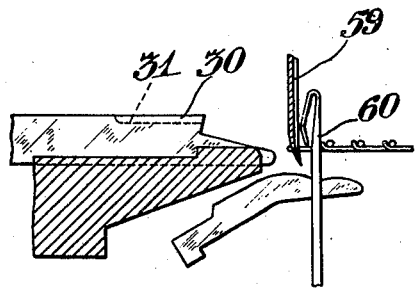

In Figs. 16 and 17 the point is moving downward to close the beard of the needle as shown in Fig. 17, the timing of the point and needle being graphically shown by Figs. 12 to 14. Further travel of the point enables the same to engage the loop of the last course of the fabric as shown in Figs. 18 and 23. When this has been accomplished, the needle moves away from the point as shown in Figs. 19 and 24 and directly after this movement the point is given a lateral movement as shown in Figs. 20 and 25 to spread the loop from one wale into an adjacent wale to be engaged by companion needles. Due to the timing of the relative movements of the needle and point, the lower position of engagement between the point and needle and the slight rising of the needle as shown in Figs. 18, 19 and 20, the lateral shifting of the loop locates one limb of the spread loop under the beard of the needle that created the same thereby retaining a portion of the loop on its original needle with an extended bight portion of the loop positioned to engage around the adjacent needle in its upward travel. In the start of the upward travel of the needle, the point and needle are in the relative position illustrated in Fig. 21, the loop being spread into position by its point to enable the next adjacent needle to pass therethrough in the upper movement of the needle. In Fig. 22, I have shown the point fully raised and the needle raised to a position to receive a new thread for the formation of a new course of loops, such course being drawn through the spread loop previously formed. In Fig. 22, and also in Fig. 3, I have broadly illustrated a yarn carrier 61 for laying the new thread and yarn carrier 61 is operated in the usual manner characteristic of a Reading full fashioned stocking knitting machine. Therefore, illustration of mechanism for the operation of the yarn carrier has been eliminated for clearness.

In Fig. 9, I have designated by the numerals 15b to 22b the various cam portions of the needle cam that cofunction with the needle mechanism to produce the relative movements of the row of needles in relation to the row of points as shown in Figs. 15 to 22.

In Fig. 12, I have designated positions in the travel of the needle corresponding to the positions of the needle illustrated in Figs. 15 to 22.

In Fig. 10, I have designated by the numerals 15c to 22c the various cam portions of the point cam that cofunctions with the point mechanism to produce the required movements of the point mechanism relative to the row of needles to accomplish the positioning of the points as shown in Figs. 15 to 22.

In Figs. 13 and 14, I have designated by the numerals 15d to 22d positions on the diagrams of the path of travel of the points corresponding to the positions of the points as shown in Figs. 15 to 22.

In the operation of the type of machine just described, the fabric is knitted in the usual manner to produce courses of plain loops and at predetermined intervals selected courses are acted upon to spread predetermined loops thereof as herein set forth to produce spread interlocking loops that are scattered in a non-uniform manner over the fabric, or uniformly positioned over the fabric, or systematically arranged in predetermined courses to produce barrier courses. In the production of each barrier or interlocking course, a plain course of loops is formed and then the lock stitch motion mechanism F is put into operation by shifting the cam shaft 13 to the right which may be accomplished automatically by the means of buttons 20a on the pattern or narrowing chain 20. Shifting the cam shaft 13 causes the point cam 17 and levers 37 to rock the frame 36 to lower the points 39 into cooperative relation with the row of needles for preforming the movements set forth in Figs. 15 to 25. The follower 42 of the point rod 41 is constantly urged towards the slide block 43 by pivotal lever 63 acted upon by a spring 64 so that the block 43 is capable of progressively shifting the point rod in one direction, the spring 64 functioning to progressively move the point rod in the reverse direction in accordance with the movements of the slide block 43. As the follower 42 of the point rod 41 normally engages the neutral cam face 49, the points carried by the rod 41 when lowered will engage predetermined loops and as the points of the rod 41 are of a number equal to half the number of the needles, it will be appreciated that the points will engage alternate loops so that when the block 43 is slid vertically to bring the cam face 50 into operative engagement with the follower 42, the point rod 41 will be shifted horizontally to spread the loops as heretofore set forth. The returning of the shaft 13 to its neutral position enables the returning of the block 43 to its normal position thereby allowing the point rod to return to its normal position through the action of spring 64. The movement of the parts just described can be repeated as often as necessary for engaging and spreading predetermined loops.

The selected loops may be spread to the right, instead of to the left, by shaping the cam 47 so that it will slide the cam block to cause its surface 50 to engage follower 42, Fig. 28, before the points 39 are in engagement with the loops to be spread, and after engagement of the points with the loops will slide the cam block from 50 to 49, Fig. 27, thus shifting the point rod and points one needle to the right. Fig. 8 shows the contour of a cam 47a adapted for right hand spreading.

During the loop spreading operation it is necessary to prevent movement of the narrowing rods 53, 53a, and also that movement of the thread carrier rods 61 (Fig. 3) peculiar to the narrowing operation; this may be done automatically by the use of an attachment such as that shown in Figs. 69 to 71, hereinafter described, or may be done manually by throwing out the pawls 54, 55 (Figs. 1, 2 and 4) which, in the narrowing operation, engage ratchets 54a and 55a to actuate the narrowing and thread carrier rods, respectively.

The points 39 may be spaced or aligned in any desired manner in the point bar 40 with respect to the needles to determine which loops in the course shall be spread. Thus, instead of having the points spaced for alternate needles, they may be aligned with every needle in a given group of needles, or throughout the entire course, so as to make every loop therein a spread loop; or the points may be spaced in any desired arrangement with respect to the needles to produce a give number of wales of plain or other loops between adjacent spread loops.

The mechanism just described is fully capable of spreading and interlocking loops and arranging the spread loops in predetermined wales, but for the purpose of arranging the spread loops in staggered positions to produce an entirely non-run or run resist fabric, that is to say, alternating the position of the spread loops in succeeding interlocking courses or producing spread loops in every wale of the fabric, I utilize the point operating mechanism illustrated in Figs. 32 to 43 which mechanism produces additional movements of the slide block 43 for giving additional movements to the point rod for selectively changing the particular loops engaged in succeeding courses by the points of the point rod previously to the spreading thereof.

In relation to the shifting mechanism shown in Figs. 32 to 43, my machine functions through the pattern control mechanism to first shift the cam shaft 13 for giving the initial movement to the block 43, and in a succeeding barrier course the pattern control mechanism functions to shift the roller 52 into engagement with cam 51 for giving the final movement to the slide block thereby producing two movements of the slide block and two progressive movements of the point rod, thereby enabling the point rod with the points to first descend and engage one group of selected loops in a course and spread the same and then descend and engage an entirely different group of wale loops in a following course for the spreading thereof. In Fig. 32 the cam shaft and cam members are in the plain knitting position, at which time roller 46 is in engagement with the round cam 48, and no movement is imparted to the cam block 43. In Fig. 33 the cams 47 and 48 are shown in the shifting position of the cam shaft 13 immediately after the cam shaft has been shifted to the right, in which position the roller 46 is caused to engage the cam 47. At this time the lever 22 has not been actuated and therefore the roller 52 has not been shifted into engagement with its coacting cam 51 and does not affect the movement of the cam block 43 by cam 47. After the cam shaft has been shifted to the right, and the points 39 are in engagement with predetermined loops to be spread, the cam block 43 is slid upwardly by rotation of cam 47, and the follower 42 is caused to slide from cam surface 49 to cam surface 50, Fig. 34, thus shifting the point rod 41 and points 39 one needle to the left to spread the selected loops between predetermined pairs of needles from one wale into an adjacent wale.

Referring to Figs. 1 and 2, it will be seen that if buttons 20e on chain 20 are used for certain courses, for example, alternate barrier courses, they will rock the lever 22 and cause the roller 52 to be shifted to the left, Fig. 35, to engage cam 51 which is shaped so as to slide the cam block 43 to cause its cam surface 50 to engage follower 42 of the point rod, Fig. 36, before the points 39 are in engagement with the loops to be spread, and after engagement of the points with the loops will slide the cam block from 50 to 56, Fig. 37, thus shifting the point rod 41 another step to the left. This will cause the spread loops in each barrier course to be offset in adjacent wales with respect to the preceding barrier course. Cam 51 is somewhat larger than cam 47, so that when roller 52 is shifted into engagement with cam 51, the roller 46 will be held out of operative engagement with cam 47, as shown in Figs. 36 and 37.

The staggered arrangement of loops may be obtained with right spread loops by the use of cams, such as cam 47a in Fig. 8, that will cause cam surface 50 to engage follower 42, Fig. 34, before the points 39 are in engagement with the loops to be spread, and after engagement of the points with the loop will slide the cam block from 50 to 49, Fig. 33, in one barrier course; in the succeeding barrier course the cam surface 56 will engage follower 42, Fig. 37, before engagement of the points with the selected loops, and after engagement of the points with the loops will slide the cam block from 56 to 50.

Figure 63:
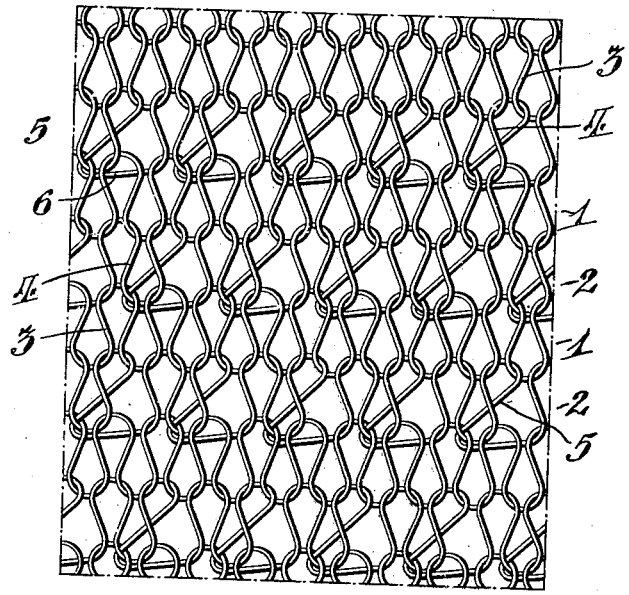
Fig. 63 is a diagrammatic view of a fabric showing interlocking loops in every wale and occupying alternate positions to produce a run proof fabric.
Figure 64:
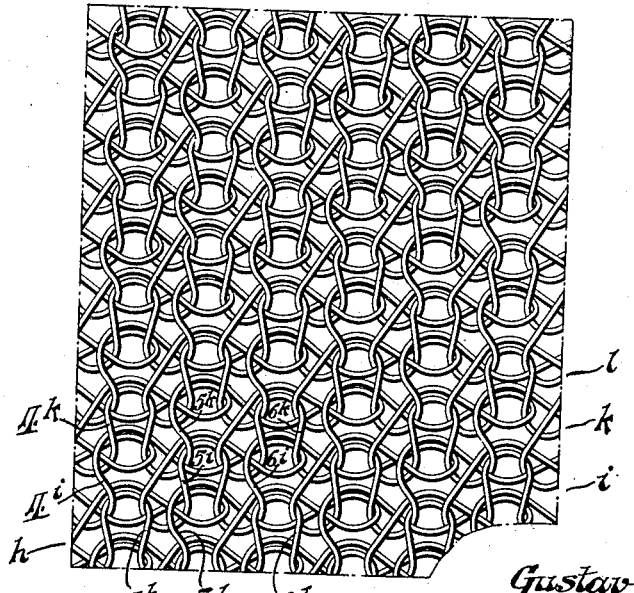
Fig. 64 is a diagrammatic view illustrating the form of fabric produced by the mechanism illustrated in Figs. 47 and 48, the fabric being shown in the position in which it comes from the machine.

The fabrics produced by the two sets of shifting mechanisms illustrated in Figs. 26, 27 and 28 and Figs. 32 to 43 inclusive, are shown in Figs. 61, 62 and 63, the first two figures illustrating a run resist fabric, whereas Fig. 63 shows an entirely non-run fabric. In Fig. 61 and 62, I have illustrated two barrier courses or interlocking courses in which the spread loops are arranged in alternate needle wales whereas in Fig. 63, I have shown the spread or interlocking courses arranged in every needle wale, the spread loops alternating in position in succeeding courses. Although I have only shown two barrier courses in Figs. 61 and 62, I wish it to be understood that any number of barrier courses may be utilized by simply repeating the operations of the textile knitting machine at required intervals.

Referring to Figs. 20 to 25, it will be seen that when the points are being shifted laterally for spreading loops from one wale into an adjacent wale, the sinkers and dividers are retracted and the points are elevated above the knock over bits so as to prevent any interference whatsoever of the points with these associated parts.

Referring to Figs. 57 to 60 inclusive, I have designated by the horizontal lines 65, diagrammatically, the courses of the fabric and have designated by the vertical lines 66, diagrammatically, the needle wales of the fabric and further have illustrated, diagrammatically, by the crosses 67, the spread or interlocking loops.

In Fig. 57, it will be noted that the spread interlocking loops are distributed in a non-uniform or unsymmetrical manner over the entire area of the fabric. In Fig. 58 the spread interlocking loops are uniformly arranged over the fabric in alternate needle wales to produce a run resist fabric.

In Fig. 59 the spread loops are arranged in alternate courses and in every wale with the spread loops in succeedings courses alternating in positions to produce an entirely run proof fabric. In Fig. 60 the spread interlocking loops are arranged in every course and in every wale to produce an entirely non-run fabric.

In Figs. 47 to 54 inclusive, I have illustrated mechanism for forming a modified form of interlocking stitch and producing a modified form of run proof fabric, the subject matter of this type of invention being a continuation of certain subject matter illustrated and described in my copending application, Serial No. 609,837, filed May 7, 1932.

This mechanism for forming the modified type of interlocking loop and for producing the modified form of run proof fabric functions basically along the lines of the type of mechanism shown in Fig. 1 and comprises a needle bar 68 provided with a plurality of needles 69, 70, 71, etc., operable for vertical movement by cam 72 on cam shaft 73 through levers 74 and 75, the latter of which has a roller 76 engageable with the needle cam 72 when the main cam shaft or power shaft 73 is shifted axially in a well known manner. The horizontal movements of the needles are controlled by a cam 87 acting through presser lever 88 cofunctioning with the needle bar in a well known manner. The usual narrowing shaft 77 is vertically movable about the rear narrowing shaft 78 to dip the usual narrowing points towards the needles and carries a transfer point rod 79 provided with transfer points 80. The cam shaft 73 has a cam 81 operative on arm 82 and rod 83 when the shaft 73 is shifted axially for vertically dipping the narrowing shaft and the transfer rod. The rod 79 is carried by the front narrowing shaft 77 and is capable of a longitudinal shifting movement to enable the points 80 to engage and spread predetermined loops. This rod 79 carries a collar 89, as shown in a copending application of Emil Richter and Paul Schmidt, Serial No. 561,536, filed September 8, 1931, engageable with one end of a centrally pivoted lever 90, the other end of which carries a roller 91 adapted to be selectively brought into engagement with either of two pattern cam discs or sections 92 and 93, the former designed to operate the point mechanism to produce ordinary lace fabric, and the latter designed to operate the point rod to spread predetermined loops and alternating their positions systematically in succeeding courses for producing interlocking loops and a non-run fabric.

Referring to Fig. 56, it will be noted that the cam disc 93 is provided upon its periphery with succeeding sets of cam surfaces 94, each set consisting of three cam surfaces with each cam surface of each set variably spaced from the axis of the disc to enable the proper shifting of the point rod to spread loops onto adjacent needles and alternate the position of the spread loops in succeeding courses. For the purpose of selectively moving the roller 91 into engagement with the discs 92 and 93, I have shown the roller 91 slidably mounted on an axle 95 and engaged by the walls of a recess 96 on a slidable pin 97 which in turn is manipulated by a shiftable handle 98. As the lever 90 is utilized to force the point rod 79 in one direction, I provide an additional lever 99, Fig. 47, to shift the point rod in the other direction and to accomplish this the lever 99 is directly pivoted to the front narrowing shaft and arranged to have one end engageable with a collar 100 fixed to the point rod and its other end connected to a spring 101 functioning to operate the lever 99 to force the point rod in the required direction. Thus, it will be appreciated that as the roller engages the cam surfaces 94 the point rod will be progressively shifted in one direction, the lever 99 functioning to force the point rod in the opposite direction in conformity to the selective engagement of the point rod with the cam surfaces of the disc. This action of the parts just described enables the points to engage loops to spread the same over a plurality of needles and to alternate the position of the spread loops in succeeding courses.

For the purpose of manipulating the discs 92 and 93 in time relation to the various operations of the knitting machine, I have shown a ratchet wheel 102 arranged in fixed relation with the discs 92 and 93 and mounted on the stub shaft 103 connected to a bracket 104 fixed to the front narrowing shaft of the narrowing mechanism to dip therewith. This ratchet wheel 102 is manipulated by a pawl 105 pivoted to an arm 106 swingingly mounted on the stub shaft 103. The arm 106 is held in a retracted position by a spring 107 and forced in the opposite direction by engagement with one arm 108 of a pivoted bell crank lever 109 that has its other arm provided with a pin 111 arranged in the path of travel of a second pin 112 carried by a toggle link connection 113 pivotally mounted on the rear narrowing shaft and including a rod 114 connected to a pivoted lever 115 carrying the roller 116 engageable with a pattern cam 117 on the main cam shaft 73.

As may be seen from the following description, the above described mechanism is designed in a manner and the cams 72 and 81 are cooperatively arranged on the shaft 73 to assure that the needles remain overlapped with the aligning points during the rise of the latter after engaging loops on certain needles in order that the loops may also be retained on the related needles. This assures that in the lateral movement of the points to spread the loops, the latter will remain engaged by the needles on which they were formed while subsequently becoming engaged with adjacent needles for interlocking purposes now to be described.

In Figs. 51 to 54 and Fig. 64, the letters $h$, $i$, $k$ and $l$ are employed to designate succeeding courses and the characters $4h$, $5h$, $6h$, $4i$, $5i$, $6i$, and $4k$, $5k$, and $6k$ designate adjacent loops in the corresponding courses, while the numerals 69, 70, 71 etc., designate the needles corresponding to the loops. As the manner of interlocking the various loops of a course is identical, the following description will, for simplicity, deal in detail with the spreading and interlocking of a single loop in a course.

After the points and the needles are brought into overlapping relation for engaging predetermined loops, the points are shifted three needles, either to the right or left, so that loops $4i$, $6i$ etc., engaged by the points are spread or carried across the intermediate needles 70 to engage the third needle 71.

Referring to Figs. 51 to 54, after the thread has been laid, and loops have been formed by the sinkers and dividers and stitches have been drawn through the previous course $h$ by the needles as usual, the transfer points descend to register with alternate needles of the course. The needles are then moved against the points and the beards of these alternate needles are closed. The needles and points then descend in unison so that alternate loops become engaged around the points as well as the needles. Then instead of the points merely taking the loops bodily off the needles and transferring to other needles, as in ordinary narrowing or lace work operation, the points and needles both rise with the latter moving upwardly more rapidly than the points so that the beards of the needles pass through and are positioned above the loops. The loops are thus retained on the needles as well as the transfer points and the needles moved away from the points to permit lateral shifting of the latter.

While the points and needles remain thus overlapped, the points are shifted to the right or left, as the case may be, to the third needles so that the loops, such as loops $4i$, $6i$ engaged by the points are spread or carried across the associated needles to positions in front of the second and third needles from that with which the points initially register, Fig. 51. After shifting of the points, the needles and points descend and the portion $a$ of the spread loop $4i$ is engaged by the beard of the intermediate needle 70, while the portion $b$ is retained by, and is under, the beard of the needle 69 around which the loop was originally formed, as shown in Fig. 52. Although the beard of the needle 71 is also open, it does not engage the loop portion $a$ which is held away therefrom by the transfer point. As this action takes place, the portion $b$ of the spread loop forms twisted or rolled bights $c$ and $d$ as a result of rolling over the tip of the intermediate needle 70 as the needle descends, Fig. 53. The needles then move against the aligning points closing their beards and are then raised, the beard of the needle 71 passing through the twisted loop bight $d$ on the engaged point, Fig. 54, so that the spread loop becomes engaged around the needle 71 as well as needle 69 on which the loop was formed and the intermediate needle 70 over which the loop portion rolled. The needles are then raised further to position the laying of the thread for the next course and the points are also raised to inactive position to repeat their cycle of operation.

It will be appreciated that by suitable design of the cam surfaces of cam disc 93, any desired pattern or arrangement of spread loops may be obtained, i. e., the cam surfaces 94 may be arranged at different points on the periphery of the cam and the radial distance between the cam surfaces may be made such as to insure the desired amount of movement of the point rod, and in the desired direction, relative to the needles. Thus, the loops may be spread either to the right or to the left, and in the same direction or in opposite directions in succeeding courses, and the loops may be spread across two, three or more needles, dependent upon the particular design of the cam disc. In the specific form shown in Fig. 56, the cam is adapted to spread loops across two needles in each course and to stagger the loops in succeeding barrier courses to give the loop arrangement shown in Fig. 63. This type of spread loop, which is not rolled in the manner of the loop of Fig. 64, may be produced by following the steps illustrated in Figs. 51 to 54, except that the loops 6 are spread over only a single adjacent needle instead of being spread over two adjacent needles. It will be seen that inasmuch as there is no intermediate needle to grasp the loop portion a, and since the loop is held by point 59 away from the needle in front of which the loop is spread, there is no twisted bight c formed as in Fig. 64. In this manner the loop is retained under the beard of the needle 69, and is thereby prevented from slipping off the needle, during the loop spreading operation. If desired, this type of loop may be produced by the foregoing mechanism employing the needle cam 72 and point cam 81 shown in Figs. 9 and 10, in which case the path of travel of the needles and points is shown diagrammatically in Figs. 12, 13 and 14 and causes the loop to be positioned below the beard of needle 69, instead of under the beard, during the loop spreading operation.

If desired, a fabric in which each loop in each interlocking course is interlocked with the adjacent loops, may be made by providing a transfer point for each needle and shifting the loops a single needle space so that the spread loops are engaged around two adjacent needles to interlock each loop with that adjacent. In this case also the spreading of loops may be alternated in direction in successive courses so as to provide interlocks in all wales.

By spreading and interlocking only certain loops at predetermined intervals and skipping the intervening loops in certain courses, rather than spreading and interlocking all or alternate loops in a course, many interlocking variations may be effected with resulting production of quite different appearing fabrics although each fabric may embody spread and interlocked loops of the same type.

It is also within the scope of my invention to utilize solely the shifting of the main cam shaft of the textile machine for the entire operation of my point mechanism, relying on manual adjustments of certain parts at required periods to prevent the functioning of those parts of the machine that control the yarn carrier mechanism and the narrowing devices.

In Figs. 65 to 68, I have shown such a type of machine comprising the main cam or power shaft 125 carrying a pattern device 126 for the operation of the slide cam mechanism 127 that has been described in detail heretofore. The device 126 includes an idle cam 128 and an actuating cam 129, the roller 130 of the slide cam mechanism 127 normally riding on idle cam 128 but upon shifting of the shaft 125 in the customary manner, cam 129 will be moved into operative engagement with roller 130 for giving the necessary movements to the slide cam mechanism 127 in the manner shown in Figs. 26 to 31. It is, of course, to be understood, that in the usual sliding action of the cam shaft, the narrowing cam 131 is moved into operative relation to roller 132 of the narrowing control device 133 that regulates the travel of the yarn carrier spindle 133b and the functioning of the narrowing spindle 133c in the usual manner. To render the narrowing control device 133 inoperative, in such case the usual pawls of the narrowing control device 133 may be manually thrown into inoperative positions in the manner customary in the art, although this manual operation may be dispensed with and the action accomplished automatically by utilization of the mechanism shown in Figs. 69, 70 and 71.

Referring to Figs. 69 to 71, it will be noted that the main pattern chain of the knitting machine functions in the usual manner to control the operation of the various mechanisms of the machine, and in addition to this pattern chain I also use a special pattern chain 134 as shown in Fig. 71 and described in detail in a copending application of Emil Richter and Paul Schmidt, Serial No. 635,490, filed September 30, 1932, carrying buttons 135 adapted to periodically actuate the link mechanism 136 that in turn actuates a latch 137 controlling the dropping of a roller 138 into operative engagement with a cam face 139 mounted on the main cam shaft. The roller 138 is carried on a swinging extension 140 of a centrally pivoted lever 141 that has a rod connection 142 to one end of the centrally pivoted lever 143 that slidably controls the positioning of the roller 144 corresponding to the roller 132 as shown in Fig. 65. Through the connection just described, the roller 144 is not shifted with the shifting of the main cam shaft, and is therefore incapable of operation by the pattern cam on the main cam shaft. It is to be understood that this mechanism is so controlled by the pattern chain that it will shift the roller 144 when a narrowing operation is to take place through the shifting of the main cam shaft. The mechanism of Figs. 69 to 71 may be used in connection with any of the foregoing machines described.

Summarizing the foregoing description, it is within the scope of my invention to provide mechanisms for the automatic distorting, displacing, or spreading of a single loop or a plurality of loops into interlocking engagement with associated loops and for alternating plain loops with interlocking loops in the same course; to provide mechanisms that will repeat the arrangement of interlocking loops in succeeding courses in the same wales; to provide mechanisms to arrange the spread interlocking loops in succeeding courses in staggered relation to position interlocking loops in every wale of the fabric; to provide mechanisms to selectively arrange in spaced relation spread interlocking loops over the area of the fabric; to provide mechanisms for systematically spreading interlocking loops in symmetrical or unsymmetrical spaced relationship over the entire area of the fabric; to provide mechanisms for the establishment of any desired numerical relation between plain loops and spread interlocking loops for producing a wide range of effects in the fabric; to provide mechanisms to automatically, semi-automatically and manually form spread interlocking loops and vary the locations of such loops in the fabric; to provide various designs and formations of cams for changing the specific characteristics of the spread interlocking loops and for causing the loops to be positioned on the stems of certain needles, either under or below the beards thereof, during the spreading operation; to provide mechanisms that will variably spread loops over two needles or a group of needles, and vary their direction of spread; to provide groups of mechanisms that upon slight redesigning will change the cooperative activities of needles, points and sinkers to produce interlocking loops of various shapes and finally providing groups of mechanisms under selective control for the selective production of plain knitted fabric, design fabric, "run resist" fabric and "run proof" fabric.

Of course, the improvements specifically shown and described, by which I attain the above results, can be changed and modified in various ways without departing from the scope of the invention herein disclosed and hereinafter claimed.

I claim:

1. In a knitting machine for producing a runproof stocking fabric portion, a yarn carrier for laying yarn to be knitted, means including needles, sinkers and dividers for forming knitted courses of loops from yarn laid by said carrier, mechanism including elements for narrowing certain of such courses, mechanism including points for spreading throughout selected courses over the entire area of the fabric portion selected loops thereof, each from one wale into an adjacent wale in interlocking engagement with associated loops, said narrowing mechanism including a member for moving the narrowing elements, actuating means for said mechanisms, pattern control means adapted to correlate said member and the actuating means to effect narrowing of the fabric, and additional pattern control means adapted to correlate said spreading mechanism and the actuating means to produce spread loops without operating the narrowing mechanism to narrow the fabric.

2. In a knitting machine for producing a runproof stocking fabric portion, means including needles for forming knitted courses of loops, mechanism including points for narrowing certain of such courses, mechanism including points for spreading throughout selected courses over the entire area of the fabric portion selected loops thereof, each from one wale into an adjacent wale in interlocking engagement with associated loops, said narrowing mechanism including a member for moving the narrowing points, actuating means for said mechanisms, pattern control means adapted to correlate said member and the actuating means to effect narrowing of the fabric, and additional pattern control means adapted to correlate said spreading mechanism and the actuating means to produce spread loops without operating the narrowing mechanism to narrow the fabric.

3. In a knitting machine for producing a runproof stocking fabric, means including needles for forming knitted courses of loops and points for fashioning the courses and spreading coursewise over the entire area of the fabric selected loops, each from one wale into an adjacent wale in interlocking relation to associated loops, said means including means for shifting the points, actuating means for the point shifting means, mechanism including an element for controlling the relation of the actuating means to the pointshifting means, normally inactive means for correlating the point-shifting and actuating means, means for controlling said element for actuating said normally inactive means, further means solely for controlling said element to actuate said normally inactive means, a pattern device for controlling the operation of said first elementcontrol means, and a second pattern device for controlling the operation of said second elementcontrol means.

4. In a knitting machine for producing a run proof stocking fabric, means including needles for forming knitted courses of loops and means for narrowing such courses and for spreading coursewise throughout selected courses over the entire area of the fabric selected loops thereof, each from one wale into an adjacent wale in interlocking engagement with associated loops, said means including a narrowing spindle mechanism and a longitudinally movable cam shaft, pattern control means adapted to shift said cam shaft to operate said spindle mechanism and additional pattern control means adapted to shift said cam shaft without operating said spindle mechanism.

5. In a knitting machine for producing a run proof stocking fabric, means including needles for forming knitted courses of loops and means for narrowing such courses and for spreading coursewise over the entire area of the fabric selected loops thereof, each from one wale onto an adjacent wale into interlocking engagement with associated loops, said means including a narrowing spindle mechanism, a cam shaft having an operating cam for said spindle mechanism, mechanism including a latch arm for shifting said cam shaft longitudinally to position said operating cam, a lever for said spindle mechanism having a cam engaging member normally in non-engaging position, means for positioning said cam engaging member operative to actuate said latch arm, a second means to actuate said latch arm only, a pattern chain controlling said first mentioned latch arm actuating means, and an added pattern chain controlling said second latch arm actuating means.

6. In a machine for knitting a run-proof fullfashioned stocking blank, needle mechanism for producing courses of plain loops and point mechanism coacting therewith for engaging predetermined loops on said needles and spreading the same around adjacent needles, said point mechanism including a slidably mounted point rod, a cam element for providing progressive movements of the point rod in either direction and automatic means for progressively moving said cam element.

7. In a machine for knitting a run-proof fullfashioned stocking blank, needle mechanism for forming courses of plain loops and point mechanism coacting therewith for engaging predetermined loops on said needles and spreading the same around a group of needles, said point mechanism including a slidably mounted point rod, a cam element provided with a plurality of cam faces for selective engagement with said point rod for the progressive movement of the latter and means for operating said cam element.

8. In a knitting machine, a needle bank, loopmanipulating points for cooperation with predetermined needles, mechanism for actuating the points and needles relative to each other for causing the points to enter loops on certain needles for movement laterally relative thereto to spread the loops to positions in front of other needles, and mechanism for controlling the needles relative to the points to retain the loops on said certain needles and for actuating the needles and points relative to each other to effect cooperation of said other needles with portions of the spread loops for forming twisted bights therein.

9. In a knitting machine, a needle bank, loopmanipulating points for cooperation with predetermined needles, mechanism for actuating the points and needles relative to each other for causing the points to enter loops on certain needles for spreading each loop thus entered by a point beyond a second needle in front thereof to a third needle, and mechanism for controlling the needles relative to the points to cause the second needle to descend from behind the spread loop and rise in front of it whereby to twist the bight thereof.

10. In a knitting machine having straight needle bars, loop transfer points alignable with determined needles; cam mechanism adapted to lower said points for entering loops on certain needles for movement laterally along the line of needles to spread said loops to positions in front of other determined needles; and cam mechanism for controlling said needles to retain the point engaged loops on said needles and for lowering said needles for effecting engagement of said other determined needles with portions of said spread loops to cause said spread loops to roll over said other needles for forming twisted bights in said loops.

GUSTAV GASTRICH.